US012581303B2

(12) United States Patent
    Inagaki

(10) Patent No.: US 12,581,303 B2
(45) Date of Patent: Mar. 17, 2026

(54) COMMUNICATION APPARATUS, METHOD, STORAGE MEDIUM STORING PROGRAM, AND SYSTEM

(71) Applicant: CANON KABUSHIKI KAISHA, Tokyo (JP)

(72) Inventor: Koji Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 18/617,418

(22) Filed: Mar. 26, 2024

(65) Prior Publication Data

US 2024/0267733 A1     Aug. 8, 2024

Related U.S. Application Data

(63) Continuation of application No. PCT/JP2022/032971, filed on Sep. 1, 2022.

(30) Foreign Application Priority Data

Oct. 1, 2021   (JP) ................................. 2021-163074

(51) Int. Cl.
    *H04W 12/08*      (2021.01)
    *H04W 12/03*      (2021.01)
    *H04W 76/11*      (2018.01)
(52) U.S. Cl.
    CPC ........... *H04W 12/08* (2013.01); *H04W 12/03* (2021.01); *H04W 76/11* (2018.02)

(58) Field of Classification Search
    CPC ..... H04W 12/08; H04W 12/03; H04W 76/11; H04W 12/50; H04W 12/047; H04W 12/77; H04W 76/10; H04W 76/14; H04W 76/15; H04W 92/08
    See application file for complete search history.

(56) References Cited

U.S. PATENT DOCUMENTS

| | | | | |
|---|---|---|---|---|
| 9,538,375 B2 * | 1/2017 | Okubo | ................ | H04L 63/0853 |
| 10,785,816 B2 * | 9/2020 | Moritomo | ............. | H04W 48/16 |
| 2021/0099305 A1 * | 4/2021 | Shibata | ............... | H04L 63/0853 |

FOREIGN PATENT DOCUMENTS

| | | |
|---|---|---|
| JP | 2006261938 A | 9/2006 |
| JP | 2016213573 A | 12/2016 |
| JP | 2019114910 A | 7/2019 |
| JP | 2021057760 A | 4/2021 |

* cited by examiner

*Primary Examiner* — Abiy Getachew
(74) *Attorney, Agent, or Firm* — Canon U.S.A., Inc., IP Division

(57) ABSTRACT

A communication apparatus displays, on a display unit, to be captured by an information processing apparatus, display information including first information used for communication for establishing, by a first connection method, wireless connection between the communication apparatus and an external access point different from the information processing apparatus and the communication apparatus, and second information for establishing, by a second connection method without intervention of the external access point, wireless connection between the information processing apparatus and the communication apparatus.

24 Claims, 11 Drawing Sheets

F I G. 3

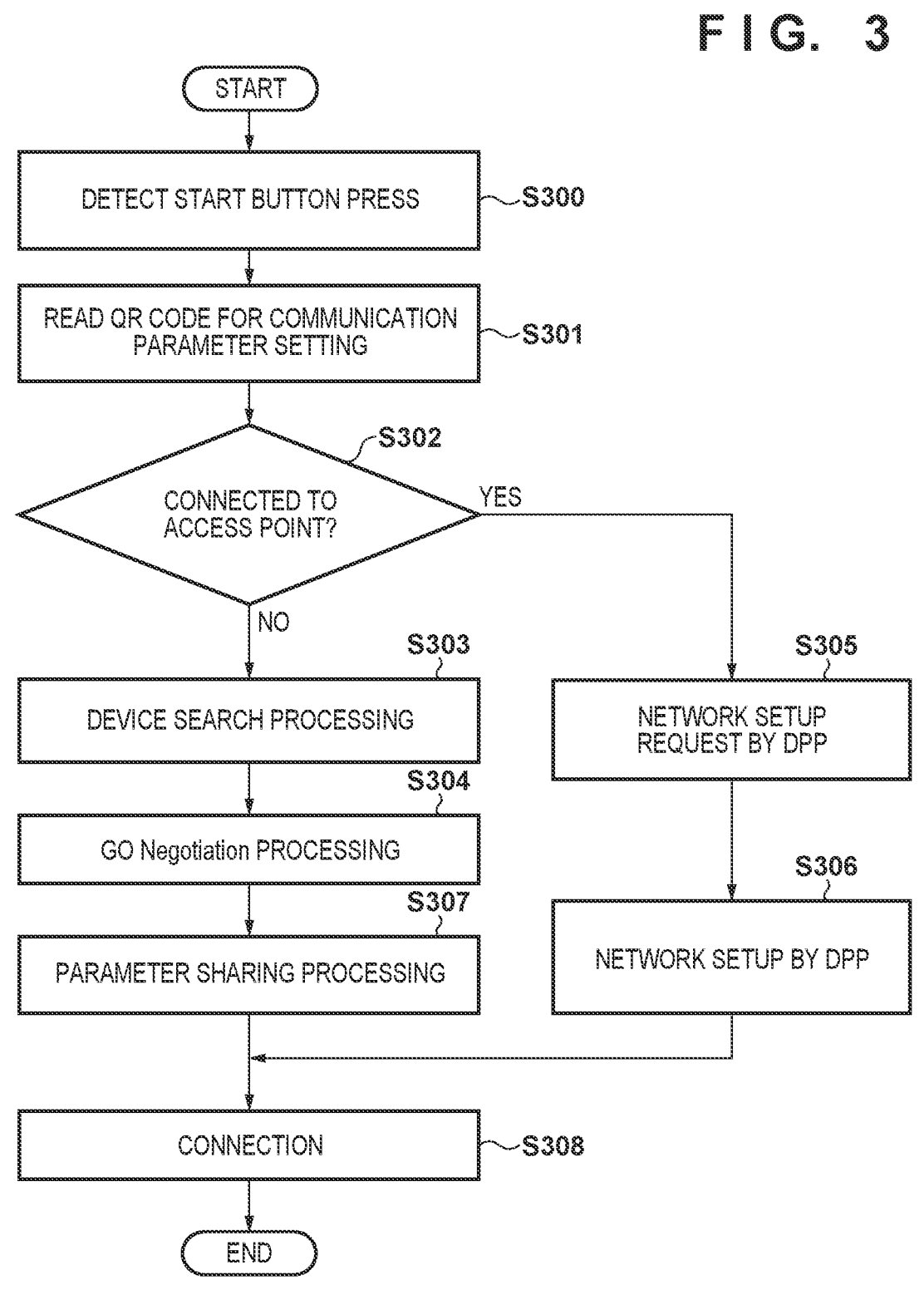

START

DETECT START BUTTON PRESS    ~S300

READ QR CODE FOR COMMUNICATION
PARAMETER SETTING    ~S301

S302

CONNECTED TO
ACCESS POINT?     YES

NO

S303
DEVICE SEARCH PROCESSING

S304
GO Negotiation PROCESSING

S307
PARAMETER SHARING PROCESSING

S305
NETWORK SETUP
REQUEST BY DPP

S306
NETWORK SETUP BY DPP

CONNECTION    ~S308

END

F I G.  6

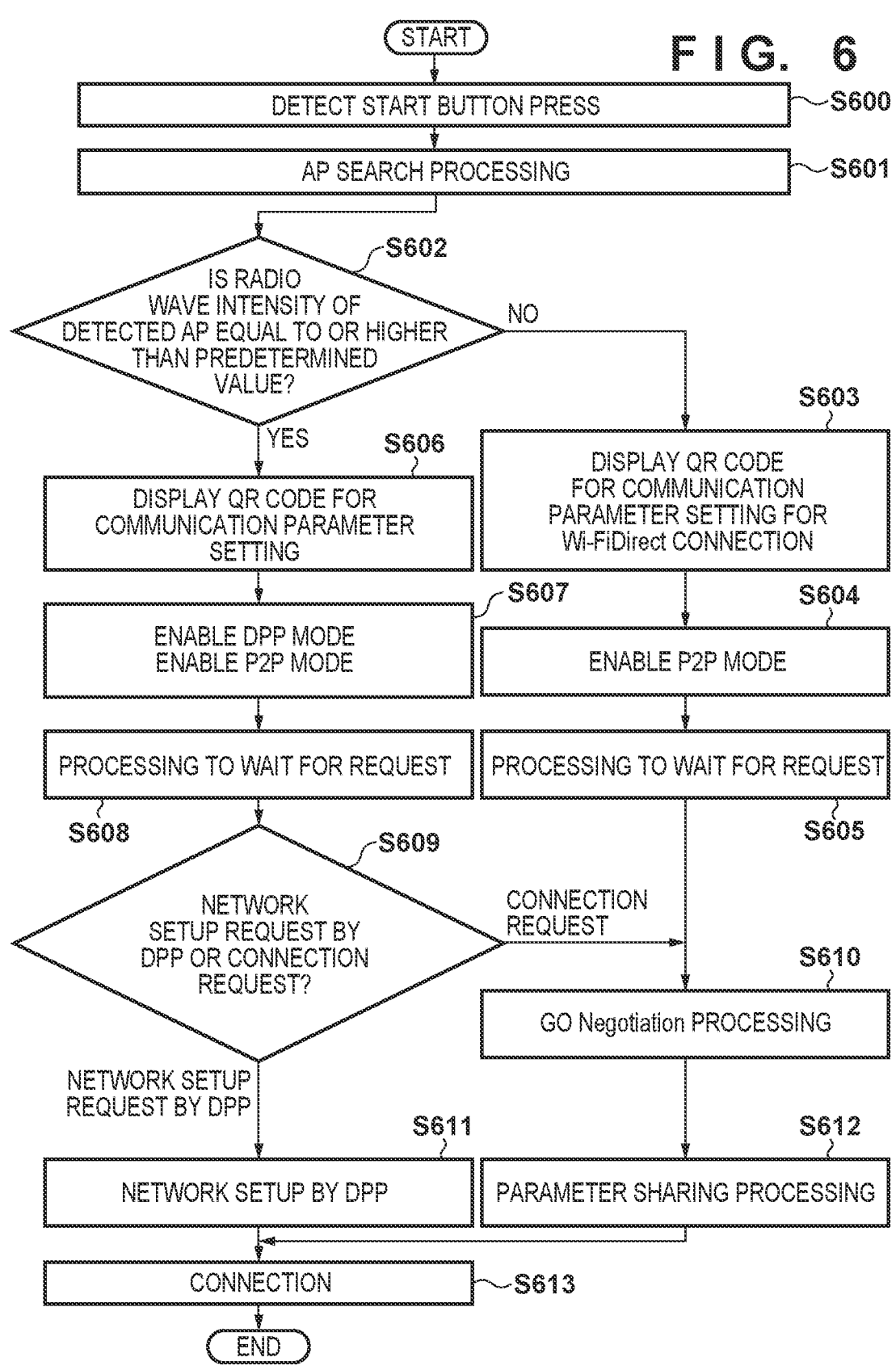

START

DETECT START BUTTON PRESS — S600

AP SEARCH PROCESSING — S601

S602

IS RADIO WAVE INTENSITY OF DETECTED AP EQUAL TO OR HIGHER THAN PREDETERMINED VALUE?

NO

YES

S606
DISPLAY QR CODE FOR COMMUNICATION PARAMETER SETTING

S603
DISPLAY QR CODE FOR COMMUNICATION PARAMETER SETTING FOR Wi-FiDirect CONNECTION

S607
ENABLE DPP MODE ENABLE P2P MODE

S604
ENABLE P2P MODE

PROCESSING TO WAIT FOR REQUEST

PROCESSING TO WAIT FOR REQUEST

S608

S605

S609
NETWORK SETUP REQUEST BY DPP OR CONNECTION REQUEST?

CONNECTION REQUEST

S610
GO Negotiation PROCESSING

NETWORK SETUP REQUEST BY DPP

S611
NETWORK SETUP BY DPP

S612
PARAMETER SHARING PROCESSING

CONNECTION — S613

END

F I G.  7A
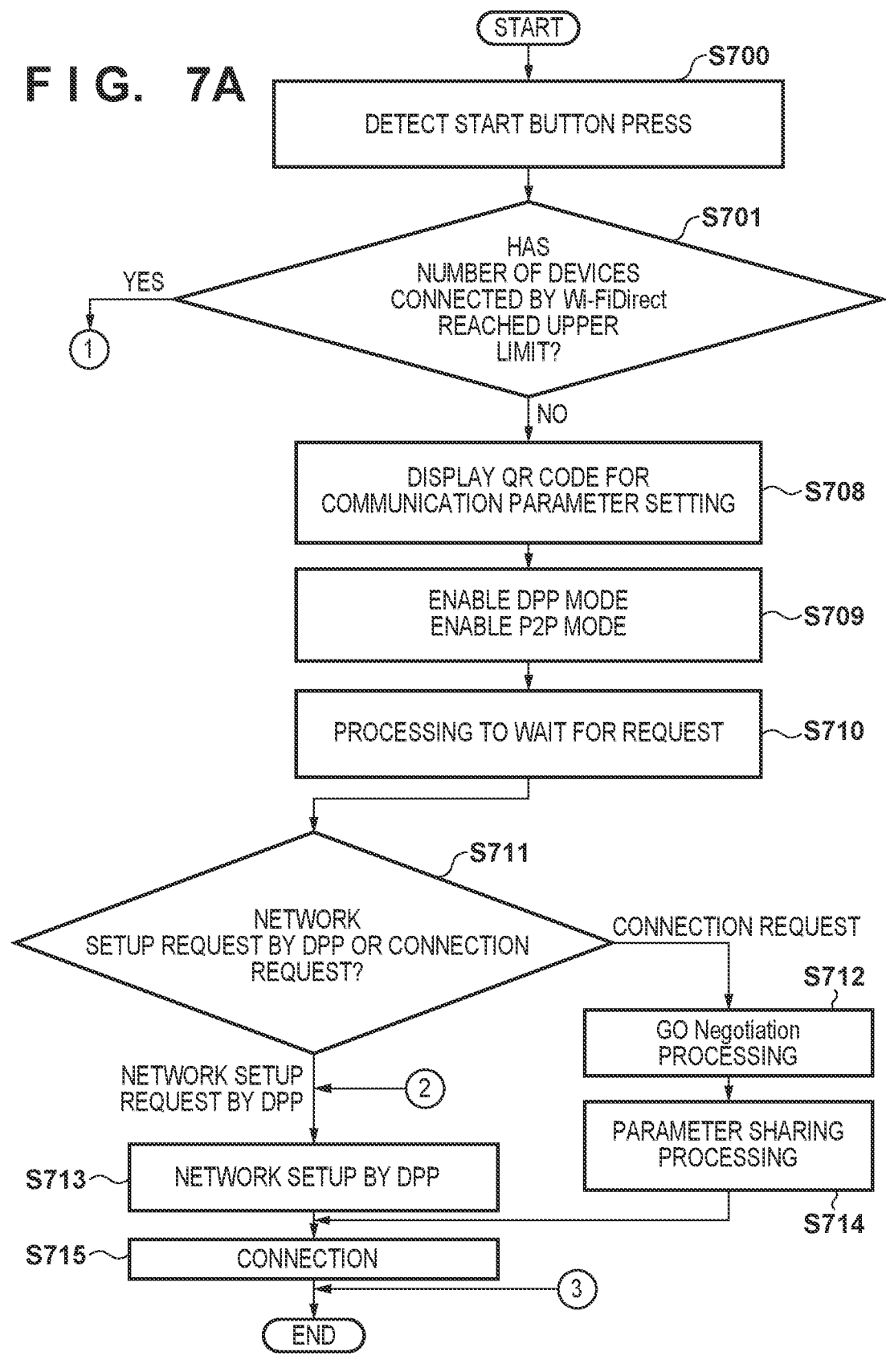

F I G. 7B
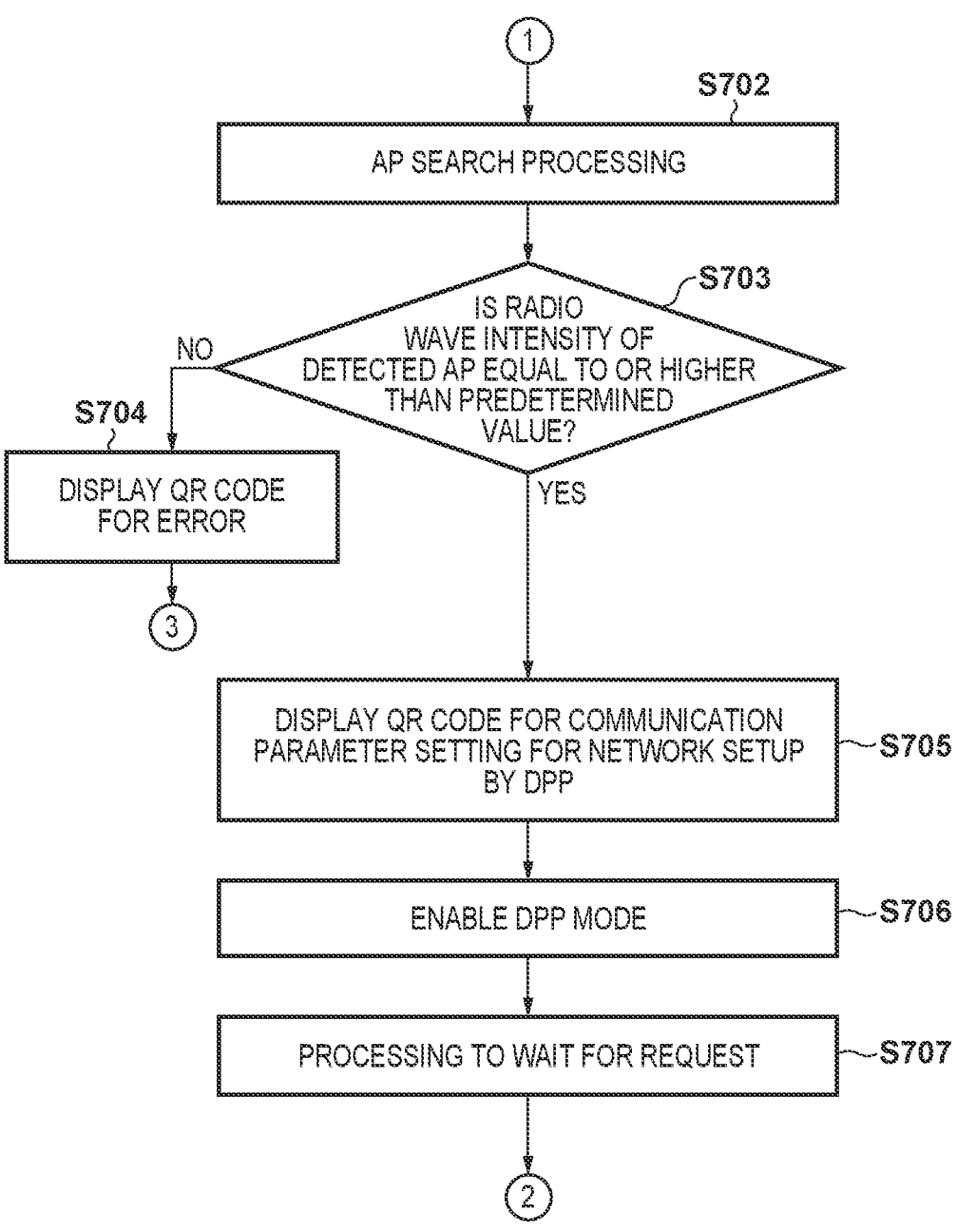

F I G.  8B
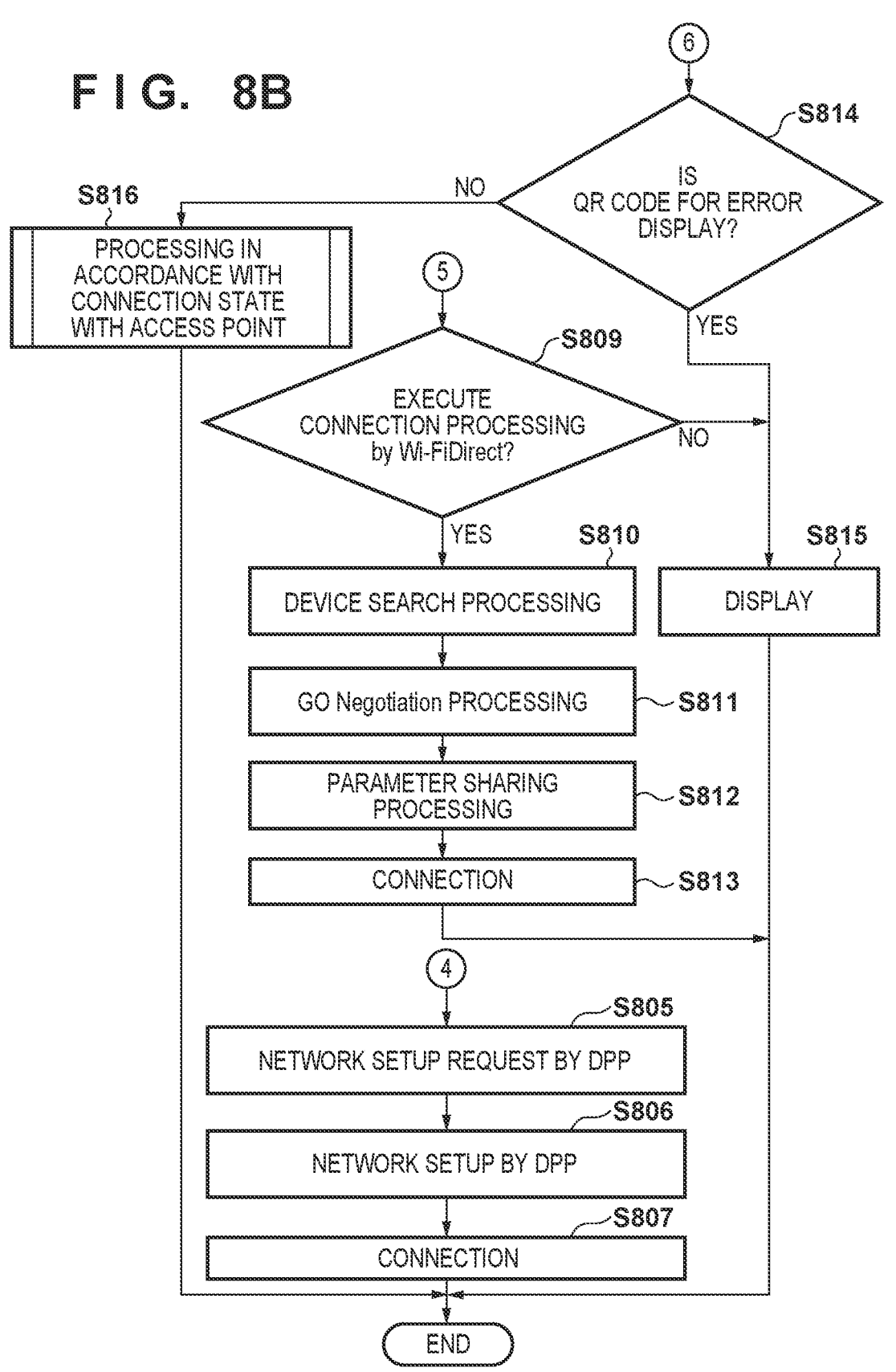

COMMUNICATION APPARATUS, METHOD, STORAGE MEDIUM STORING PROGRAM, AND SYSTEM

CROSS-REFERENCE TO RELATED APPLICATIONS

This application is a Continuation of International Patent Application No. PCT/JP2022/032971, filed Sep. 1, 2022, which claims the benefit of Japanese Patent Application No. 2021-163074, filed Oct. 1, 2021, both of which are hereby incorporated by reference herein in their entirety.

BACKGROUND OF THE INVENTION

Field of the Invention

The present invention relates to a communication apparatus capable of establishing wireless connection to an external apparatus, a method, a program, and a system.

Background Art

In recent years, there are increasing cases in which a wireless communication function is mounted on electronic devices such as a digital camera, a printer, and a portable telephone/smartphone and these devices are connected to a wireless network and used as communication apparatuses. To connect the electronic device to the wireless network, it is necessary to set various communication parameters such as an encryption method, an encryption key, an authentication method, and an authentication key. Therefore, setting of the communication parameters is complicated, and is difficult for the user of a digital camera or a printer. Thus, a mechanism for facilitating setting of the communication parameters is used. To prevent leakage of information of the communication parameters and the like, a mechanism of concealing the communication parameters by public-key cryptography and notifying a user terminal of them is also used.

PTL 1 describes a technique of facilitating setting of communication parameters in a communication terminal via the medium of a QR code® image including information of the communication parameters. PTL 2 describes a technique in which when a user selects a method of setting communication parameters, a QR code corresponding to the selection is displayed.

However, if there exist a plurality of methods of setting communication parameters using a displayed image, images the number of which corresponds to the number of setting methods are displayed, and it is difficult for the user to know which of the displayed images is to be captured. Even if the user selects a setting method and an image corresponding to the selection is displayed, the user needs to recognize which setting method is to be selected.

CITATION LIST

Patent Literature

PTL 1: Japanese Patent Laid-Open No. 2006-261938
PTL 2: Japanese Patent Laid-Open No. 2016-213573

SUMMARY OF THE INVENTION

The present invention provides a communication apparatus for improving user convenience when establishing wireless connection between apparatuses, a method, a program, and a system.

The present invention in one aspect provides a communication apparatus communicable with an information processing apparatus, comprising: at least one memory and at least one processor which function as: a display control unit configured to display, on a display unit, to be captured by the information processing apparatus, display information including first information used for communication for establishing, by a first connection method, wireless connection between the communication apparatus and an external access point different from the information processing apparatus and the communication apparatus, and second information for establishing, by a second connection method without intervention of the external access point, wireless connection between the information processing apparatus and the communication apparatus; a reception unit configured to receive a request transmitted from the information processing apparatus based on one of the first information and the second information; a communication unit configured to execute the communication for establishing the wireless connection by the first connection method based on the request transmitted based on the first information; a first connection unit configured to establish the wireless connection by the first connection method based on the communication for establishing the wireless connection by the first connection method; and a second connection unit configured to establish the wireless connection by the second connection method based on the request transmitted based on the second information.

Further features of the present invention will become apparent from the following description of exemplary embodiments with reference to the attached drawings.

BRIEF DESCRIPTION OF THE DRAWINGS

FIG. 3 is a flowchart illustrating connection processing executed by the information processing apparatus.

FIG. 6 is a flowchart illustrating connection processing executed by a communication apparatus.

FIG. 7A is a flowchart illustrating connection processing executed by a communication apparatus.

FIG. 7B is a flowchart illustrating the connection processing executed by the communication apparatus.

FIG. 8B is a flowchart illustrating the connection processing executed by the information processing apparatus.

DESCRIPTION OF THE EMBODIMENTS

Figure 1:
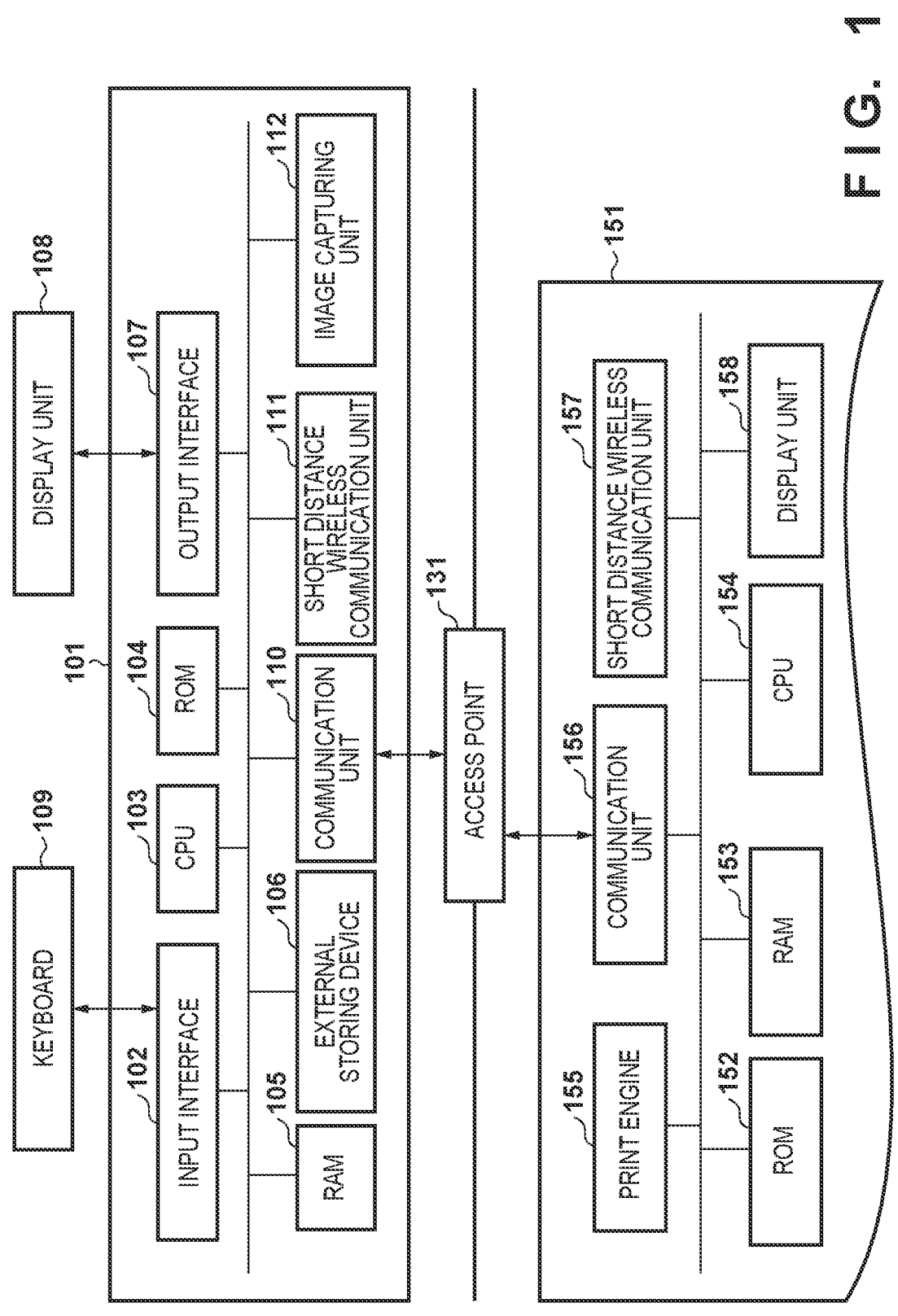
FIG. 1 is a block diagram showing components of an information processing apparatus and a communication apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An information processing apparatus 101 and a communication apparatus 151 included in a communication system according to this embodiment will be described. In this embodiment, a smartphone is exemplified as the information processing apparatus 101 but the present invention is not limited to this. For example, as the information processing apparatus 101, various kinds of apparatuses such as a portable terminal, a PC (Personal Computer), a tablet terminal, a PDA (Personal Digital Assistant), and a digital camera are applicable. A printer is exemplified as the communication apparatus 151 but the present invention is not limited to this, and various kinds of apparatuses are applicable as long as they can perform wireless communication with the information processing apparatus 101. For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

In this embodiment, if the information processing apparatus 101 supports a function called Wi-Fi Easy Connect (to be referred to as WEC® hereinafter), it can execute this function. WEC is a function of executing a network setup of another apparatus using Device Provisioning Protocol (to be referred to as DPP hereinafter) defined by the Wi-Fi Alliance. Note that a network setup of another apparatus especially indicates processing of connecting another apparatus to an access point forming a network.

In WEC, an apparatus (to be referred to as a Configurator apparatus hereinafter) operating in the role of "Configurator" and an apparatus (to be referred to as an Enrollee apparatus hereinafter) operating in the role of "Enrollee" communicate with each other. The Configurator apparatus acquires Bootstrapping information from the Enrollee apparatus. The Bootstrapping information includes, for example, identification information (MAC address or the like) of the Enrollee apparatus, and public key information to be used to execute secure communication with the Enrollee apparatus. In this embodiment, the Bootstrapping information is described as "WEC associated information". Note that other information may be used as WEC associated information. Then, the Configurator apparatus executes wireless communication with the Enrollee apparatus using the acquired Bootstrapping information. More specifically, for example, the Configurator apparatus encrypts a protocol key using the public key included in the Bootstrapping information, and transmits the encrypted protocol key to the Enrollee device. Furthermore, the Configurator apparatus encrypts a common key based on the encrypted protocol key, and transmits information encrypted using the common key (shared key) to the Enrollee device. Note that the transmitted information is especially, for example, connection information for connection to the access point. Then, the Enrollee apparatus establishes wireless connection to the access point using the connection information received from the Configurator apparatus. Note that in network setup processing by WEC according to this embodiment, the information processing apparatus 101 supporting WEC is assumed to operate as the Configurator apparatus. In addition, the communication apparatus 151 supporting WEC is assumed to operate as the Enrollee apparatus.

First, components of the information processing apparatus 101 of this embodiment and the communication apparatus 151 communicable with the information processing apparatus 101 of this embodiment will be described with reference to a block diagram shown in FIG. 1. Although this embodiment will exemplify the following components, the present invention is not limited to functions shown in FIG. 1. Components corresponding to functions executable by apparatuses that are applicable as apparatuses communicable with each other are appropriately provided.

The information processing apparatus 101 includes an input interface 102, a CPU 103, a ROM 104, a RAM 105, an external storage device 106, an output interface 107, a display unit 108, a communication unit 110, and a short distance wireless communication unit 111. The CPU 103, the ROM 104, the RAM 105, and the like form a computer of the information processing apparatus 101 for executing a program.

The input interface 102 is an interface for accepting data input and operation instructions from the user when an operation unit such as a keyboard 109 is operated. Note that the operation unit may include a physical keyboard and physical buttons, or may include a software keyboard and software buttons displayed on the display unit 108. That is, the input interface 102 may accept input from the user via the display unit 108.

The CPU 103 is a system control unit and controls the whole information processing apparatus 101. The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by an SRAM (Static Random Access Memory) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program (to be referred to as a setting application) configured to perform a network setup of the communication apparatus 151, a print information generation program that generates print information interpretable by the printing apparatus 151, and the like. The setting application is an application program for setting an access point as the connection destination of the communication apparatus 151 by WEC or the like. Note that the setting application may have functions other than the network setup function. For example, the setting application may have a function of causing the communication apparatus 151 to execute printing, a function of scanning a document set on a document table of the communication apparatus 151, a function of confirming the state of the communication apparatus 151, and the like. The setting application is stored in the external storage device 106 by being installed from an external server by, for example, Internet communication via the communi-
cation unit 110. Furthermore, the external storage device 106
stores various kinds of programs such as an information
transmission/reception control program to be transmitted/
received to/from the communication apparatus 151 con-
nected via the communication unit 110, and various kinds of
information to be used by the programs.

The output interface 107 is an interface configured to
perform control for causing the display unit 108 to display
data or make a notification concerning the state of the
information processing apparatus 101. The display unit 108
is formed by an LED (Light-Emitting Diode), an LCD
(Liquid Crystal Display), or the like and displays data or
makes a notification concerning the state of the information
processing apparatus 101. An image capturing unit 112 is,
for example, a camera that captures the outside.

The communication unit 110 is a component connected to
the apparatus such as the communication apparatus 151 or
an access point 131 to execute data communication. For
example, the communication unit 110 can be connected to an
access point (not shown) in the communication apparatus
151. If the communication unit 110 and the access point in
the communication apparatus 151 are connected, the infor-
mation processing apparatus 101 and the communication
apparatus 151 can communicate with each other. Note that
the communication unit 110 may directly communicate with
the communication apparatus 151 by wireless communica-
tion, or may perform communication via an external appa-
ratus existing outside the information processing apparatus
101 and the communication apparatus 151. Note that
examples of the external apparatus include an external
access point (the access point 131 or the like) existing
outside the information processing apparatus 101 and the
communication apparatus 151, and an apparatus, other than
the access point, that can relay communication. In this
embodiment, as a wireless communication method used by
the communication unit 110, Wi-Fi (Wireless Fidelity)®
which is a communication standard based on the IEEE
802.11 series is used. WEC described above can be executed
by communication by the communication unit 110. In addi-
tion, for example, a device such as a wireless LAN router is
used as the access point 131. Note that in this embodiment,
the method of directly connecting the information process-
ing apparatus 101 and the communication apparatus 151
without intervention of an external access point is called a
direct connection method. In addition, the method of con-
necting the information processing apparatus 101 and the
communication apparatus 151 via the external access point
is called an infrastructure connection method.

The short distance wireless communication unit 111 is a
component wirelessly connected to the apparatus such as the
communication apparatus 151 in a short distance to execute
data communication, and performs communication by a
communication method different from that of the commu-
nication unit 110. The short distance wireless communica-
tion unit 111 can be connected to, for example, a short
distance wireless communication unit 157 in the communi-
cation apparatus 151. As the communication method, for
example, Near Field Communication (NFC), Bluetooth©
Classic, Bluetooth Low Energy (BLE), a Wi-Fi Aware, or the
like is used.

In this embodiment, the information processing apparatus
101 executes WEC by the OS of the information processing
apparatus 101 based on an execution instruction of network
setup processing by the setting application.

The communication apparatus 151 serves as the commu-
nication apparatus of this embodiment. The communication apparatus 151 includes a ROM 152, a RAM 153, a CPU 154,
a print engine 155, a communication unit 156, and the short
distance wireless communication unit 157. The ROM 152,
the RAM 153, the CPU 154, and the like form a computer
of the communication apparatus 151 for executing a pro-
gram.

The communication unit 156 includes, as the access point
in the communication apparatus 151, an access point for
connection to the external apparatus such as the information
processing apparatus 101. Note that the access point can be
connected to the communication unit 110 of the information
processing apparatus 101. If the communication unit 156
enables the access point, the communication apparatus 151
operates as the access point. Note that the communication
unit 156 may directly, wirelessly be connected to the infor-
mation processing apparatus 101 or may wirelessly be
connected to the information processing apparatus 101 via
the access point 131. In this embodiment, as the wireless
communication method used by the communication unit
156, a communication standard based on the IEEE 802.11
series is used. If the communication apparatus 151 supports
WEC, WEC describe above is executed by communication
by the communication unit 156. The communication unit
156 may include a hardware component functioning as an
access point or may operate as an access point by software
for functioning as an access point.

The communication apparatus 151 of this embodiment
can operate in an infrastructure mode or a P2P (Peer-To-
Peer) mode as a mode for performing communication using
the communication unit 156.

The infrastructure mode is a mode in which the commu-
nication apparatus 151 communicates with another appara-
tus such as the information processing apparatus 101 via an
external apparatus (for example, the access point 131)
forming a network. Connection to the external access point,
which is established by the communication apparatus 151
operating in the infrastructure mode, is called infrastructure
connection hereinafter. In this embodiment, in the infrastruc-
ture connection, the communication apparatus 151 operates
as a slave unit and the external access point operates as a
master unit. Note that in this embodiment, the master unit is
an apparatus that decides a communication channel used in
a network to which the master unit belongs, and the slave
unit is an apparatus that does not decide a communication
channel used in a network to which the slave unit belongs,
and uses the communication channel decided by the master
unit.

The P2P mode is a mode in which the communication
apparatus 151 directly communicates with another apparatus
such as the information processing apparatus 101 without
intervention of an external apparatus forming a network. In
this embodiment, the P2P mode includes an AP mode in
which the communication apparatus 151 operates as an
access point. In the AP mode, connection information (SSID
and password) of the access point enabled in the commu-
nication apparatus 151 can arbitrarily be set by the user.
Note that the P2P mode may include, for example, a WFD
mode in which the communication apparatus 151 performs
communication by Wi-Fi Direct (WFD). Note that which of
a plurality of WFD-capable apparatuses operates as a master
unit is decided in accordance with, for example, the Group
Owner Negotiation procedure. The master unit may be
decided without executing the Group Owner Negotiation
procedure (to be referred to as a GO Negotiation procedure
hereinafter). An apparatus that is a WFD-capable apparatus
and serves as a master unit is especially called a Group
Owner. Direct connection to another apparatus, which is established by the communication apparatus 151 operating in the P2P mode, is called direct connection. In this embodiment, in the direct connection, the communication apparatus 151 operates as a master unit and the other apparatus operates as a slave unit. Note that in this embodiment, the communication apparatus 151 starts an operation in the P2P mode based on execution of an operation of displaying a two-dimensional code for enabling the information processing apparatus 101 to acquire WEC associated information (to be described later). However, the timing/condition of starting an operation in the DPP mode is not limited to this. For example, an operation in the P2P mode may be started based on reception of a P2P mode shift instruction from the information processing apparatus 101 in a state in which the communication apparatus 151 operates in a network setup mode (to be described later) or execution of a predetermined operation other than the operation of displaying the two-dimensional code.

Furthermore, in this embodiment, the communication apparatus 151 can operate in the network setup mode as a mode of executing a network setup of the communication apparatus 151 by a predetermined communication protocol (setup communication protocol) by accepting a predetermined operation from the user. If the communication apparatus 151 operates in the network setup mode, it uses the communication unit 156 to operate as a setup access point which is enabled during the operation in the network setup mode. The setup access point is an access point different from an access point enabled in the above-described AP mode. Assume that the SSID of the setup access point includes a predetermined character string that can be recognized by the setting application of the information processing apparatus 101. Assume that the setup access point is an access point that does not require a password for connection. In addition, assume that the communication apparatus 151 operating in the network setup mode uses the setup communication protocol in communication with the information processing apparatus 101 connected to the setup access point. More specifically, the setup communication protocol is, for example, SNMP (Simple Network Management Protocol). If a time-out time for the network setup mode elapses after the start of the operation in the network setup mode, the communication apparatus 151 stops the operation in the network setup mode, and disables the setup access point. This is because the setup access point is an access point that does not require a password, as described above, and thus if the access point is enabled for a long time, an inappropriate apparatus highly probably requests connection. Note that the setup access point may be an access point that requires a password. In this case, a password used for connection to the setup access point is a fixed password (unchangeable by the user) that is grasped in advance by the setting application.

Furthermore, in this embodiment, the communication apparatus 151 accepts a predetermined operation from the user, and can thus operate in a mode for executing a network setup of the communication apparatus 151 by a communication protocol different from the setup communication protocol. This embodiment assumes that the communication protocol different from the setup communication protocol is DPP described above, and this mode is called a DPP mode. Upon receiving a network setup request by DPP from the information processing apparatus 101 in a state in which the communication apparatus 151 operates in the DPP mode, the communication apparatus 151 executes a network setup by DPP, as will be described later. Therefore, in other words, the DPP mode is a mode for waiting for a network setup request by DPP. If a time-out time for the DPP mode elapses after the start of the operation in the DPP mode, the communication apparatus 151 stops the operation in the DPP mode, and stops waiting for a network setup request by DPP. Note that the time-out time for the DPP mode may be equal to the time-out time for the network setup mode, or may be longer or shorter than the time-out time for the network setup mode. In this embodiment, the communication apparatus 151 starts an operation in the DPP mode based on execution of an operation of displaying a two-dimensional code for enabling the information processing apparatus 101 to acquire WEC associated information (to be described later). In this embodiment, more specifically, the operation of displaying the two-dimensional code is, for example, the pressing of a start button (to be described later). However, the timing/condition of starting an operation in the DPP mode is not limited to this. For example, an operation in the DPP mode may be started based on the start of an operation in the network setup mode or execution of an operation of starting an operation in the network setup mode.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154, and functions as a reception buffer configured to temporarily store print information received from the information processing apparatus 101 or the like, or stores various kinds of information.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152. The CPU 154 is a system control unit and controls the whole communication apparatus 151.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is required to use, for communication of the print job, a communication method that allows high-speed communication. Therefore, the communication apparatus 151 receives the print job via the communication unit 156 that can perform communication at a speed higher than that of the short distance wireless communication unit 157. A display unit 158 is, for example, a panel, and displays data or makes a notification concerning the state of the communication apparatus 151.

Note that a memory such as an external HDD or an SD card may be attached as an optional device to the communication apparatus 151, and information stored in the communication apparatus 151 may be stored in the memory.

In this embodiment, the communication units 110 and 156 execute communication parameter sharing processing for sharing communication parameters between the apparatuses. The communication parameter sharing processing is processing in which a providing-side apparatus provides communication parameters for wireless communication to a reception-side apparatus, and can be performed in each of the infrastructure mode and the P2P mode. In this case, the communication parameters include, for example, wireless communication parameters necessary for wireless LAN communication, such as an SSID (Service Set Identifier) as a network identifier, an encryption method, an encryption key, an authentication method, and an authentication key. The communication parameters also include identification information such as a MAC address, a password, an IP address for communication on the IP layer, and information necessary for higher level services. The communication parameter sharing processing executed by the communication units 110 and 156 may be, for example, WPS (Wi-Fi Protected Setup) defined by the Wi-Fi Alliance. In the communication parameter sharing processing executed by the communication units 110 and 156, a method of safely transferring the communication parameters using public-key cryptography may be used.

In this embodiment, the information processing apparatus 101 further includes a barcode reading control unit (not shown) and the image capturing unit 112. For example, the barcode reading control unit analyzes an image captured by the image capturing unit 112 as a camera, and acquires encoded code information. The barcode reading control unit executes analysis processing of code information such as a barcode, a two-dimensional code, or a QR code®.

The communication apparatus 151 further includes a barcode generation control unit. The barcode generation control unit is not shown in FIG. 1 but is implemented when, for example, the CPU 154 executes a program. The barcode generation control unit generates code information such as a barcode, a two-dimensional code, or a QR code, and executes control to display the generated code information on the display unit 158. Note that in this embodiment, the generated code information is a two-dimensional code for enabling the information processing apparatus 101 to acquire WEC associated information. The barcode generation control unit displays, on the display unit 158, a QR code or the like obtained by encoding information necessary to set the communication parameters. Note that the display unit 158 may be a component capable of displaying software buttons and the like as an input interface of the user.

The operation of the communication system including the above components will be described. In the following description, in an example, an arrangement will be described in which the information processing apparatus 101 causes the image capturing unit 112 to capture the QR code displayed on the display unit 158 by the communication apparatus 151 and wireless connection between the apparatuses is performed using information of the captured QR code.

Figure 2:
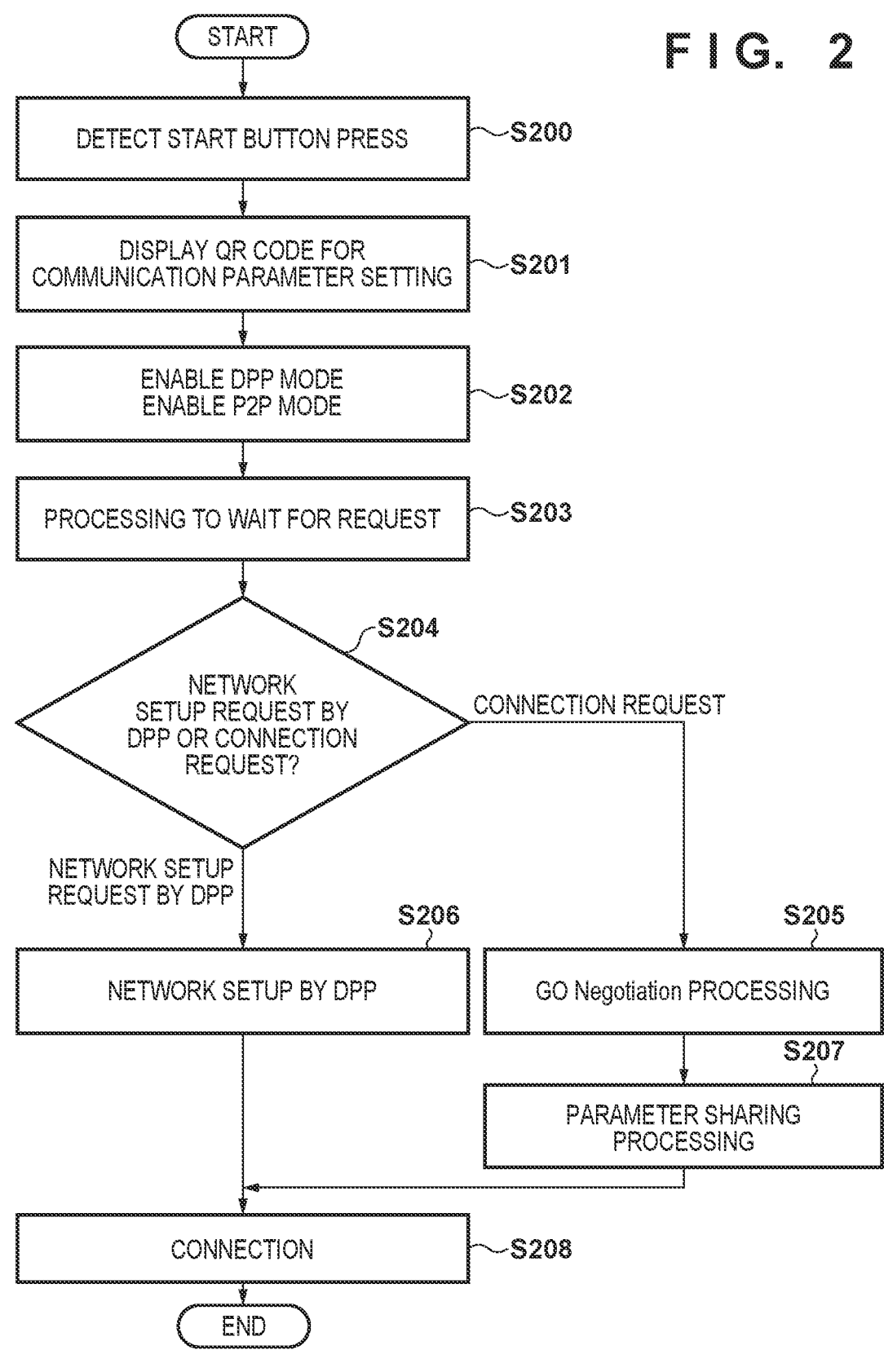
FIG. 2 is a flowchart illustrating connection processing executed by the communication apparatus.

FIG. 2 is a flowchart illustrating display control processing and connection processing of the communication apparatus 151. The processing shown in FIG. 2 is implemented when, for example, the CPU 154 reads out the programs stored in the ROM 152 into the RAM 153 and executes them.

In step S200, when the user presses a start button displayed on the display unit 158 of the communication apparatus 151, the CPU 154 of the communication apparatus 151 detects the pressing of the start button, and displays, in step S201, on the display unit 158, a QR code as display information that can be captured. For example, the start button is displayed as a QR code display menu to be selectable on a main menu. The QR code may be displayed by using, as a trigger, a timing other than the timing of pressing the start button. For example, the QR code may be displayed by using, as a trigger, reception of an instruction to display the QR code from an external apparatus.

In this embodiment, the QR code includes at least information necessary for communication in the P2P mode and information necessary for WEC. The information necessary for communication in the P2P mode and the information necessary for WEC include, as information necessary to set communication parameters, for example, information used for encryption when communicating the communication parameters and identification information of the apparatus. The information used for encryption when communicating the communication parameters may be, for example, a public key or a certificate. The identification information of the apparatus may be, for example, a UUID (Universally Unique Identifier) or a MAC address for uniquely identifying the device. The information necessary to set the communication parameters may include other information, for example, an identifier indicating the communication parameter sharing processing or identification information of a one-time password method using a QR code. More specifically, for example, the information necessary for WEC is WEC associated information. Furthermore, the information necessary for communication in the P2P mode may include, for example, an Intent value used for negotiation processing of deciding the Group Owner between the apparatuses. For example, the connection information (SSID and password) for connection to the communication apparatus 151 operating in the P2P mode may be included.

In step S202, the CPU 154 enables both the above-described DPP mode and P2P mode. By enabling the DPP mode, it is possible to wait for a network setup request by DPP from the information processing apparatus 101. By enabling the P2P mode, it is possible to wait for a connection request from the information processing apparatus 101. Note that the order of steps S201 and S202 is arbitrary, and steps S201 and S202 may be processed in an order reverse to that in FIG. 2.

In step S203, the CPU 154 waits for a request transmitted from the information processing apparatus 101 that has read the QR code displayed in step S201. The request is the above-described connection request or network setup request by DPP. The request is information based on the QR code displayed in step S201. In other words, in step S203, the CPU 154 waits for information based on the QR code displayed in step S201. Then, in step S204, the communication apparatus 151 determines whether the received request is the connection request or the network setup request by DPP.

If it is determined in step S204 that the received request is the connection request, processing for establishing Wi-Fi connection is started between the information processing apparatus 101 and the communication apparatus 151 operating in the P2P mode. More specifically, for example, in step S205, the CPU 154 executes the GO Negotiation procedure as a negotiation procedure for deciding whether the communication apparatus 151 serves as a Wi-Fi Direct Group Owner or a client that is provided with the communication parameters. Note that in the GO Negotiation procedure, for example, the apparatuses exchange intent values, and the apparatus having the larger value serves as the Group Owner and the apparatus having the smaller value serves as a Wi-Fi Direct client, as defined by Wi-Fi Direct. As described above, when the communication apparatus 151 operates in the Autonomous GO mode, the Group Owner Negotiation procedure may be omitted. When the P2P mode is not the WFD mode but the AP mode, the Group Owner Negotiation procedure may be omitted.

In step S207, the CPU 154 executes the above-described communication parameter sharing processing for sharing the communication parameters between the apparatuses. Note that in the communication parameter sharing processing executed in step S207, the communication parameters may be encrypted using public-key cryptography and communicated. At this time, the communication parameters encrypted based on the information included in the QR code displayed by the communication apparatus 151 may be communicated. Note that the communication parameters include, for example, connection information for connection to the communication apparatus 151 operating in the P2P mode. After step S207, the process advances to step S208. On the other hand, if it is determined in step S204 that the request from the information processing apparatus 101 is the network setup request by DPP, a network setup by DPP is performed, in step S206 between the communication apparatus 151 and the information processing apparatus 101, and the communication parameters are shared between the apparatuses. This processing corresponds to processes executed by the communication apparatus 151 in S401 and S402 (to be described later). After step S206, the process advances to step S208.

In step S208, the CPU 154 executes the connection processing using the shared communication parameters. Note that if the network setup request by DPP is received, the executed connection processing is processing of establishing connection between the communication apparatus 151 and the access point. This processing corresponds to processing executed by the communication apparatus 151 in S403 (to be described later). If the connection request is received, the executed connection processing is processing of establishing connection between the communication apparatus 151 and the information processing apparatus 101 without intervention of the external access point.

FIG. 3 is a flowchart illustrating processing of the information processing apparatus 101. The processing shown in FIG. 3 is implemented when, for example, the CPU 103 reads out the programs stored in the ROM 104 into the RAM 105 and executes them.

In step S300, when the user presses a start button displayed on the display unit 108 of the information processing apparatus 101, the CPU 103 of the information processing apparatus 101 detects the pressing of the start button. In step S301, the CPU 103 causes the image capturing unit 112 to read the QR code for communication parameter setting, which is displayed by the communication apparatus 151. The start button is displayed on, for example, a connection setting screen on the setting application. The QR code may be read by using, as a trigger, a timing other than the timing of pressing the start button. For example, the QR code may automatically be read by using, as a trigger, another user operation or detection of the QR code within the angle of view of the image capturing unit 112. If the captured QR code includes no information necessary to set the communication parameters, the CPU 103 may send an error notification, and end the processing shown in FIG. 3. For example, if the captured QR code includes no identification information, it is impossible to perform device search processing, and thus the CPU 103 may send an error notification, and end the processing shown in FIG. 3.

In step S302, the CPU 103 determines whether the information processing apparatus 101 is currently connected to the external access point. If it is determined in step S302 that the information processing apparatus 101 is not currently connected to the external access point, the CPU 103 starts connection processing of establishing direct connection to the communication apparatus 151. In other words, the access point currently connected to the information processing apparatus 101 is at least an access point that was connected to the information processing apparatus 101 when the start button was pressed (the setting operation was performed). In step S303, the CPU 103 executes device search processing to search for an apparatus indicated by the information included in the QR code. If the apparatus indicated by the information included in the QR code is detected, the CPU 103 executes, in step S304, device search processing and role decision processing by the GO Negotiation procedure, that are define by Wi-Fi Direct. Note that as described above, the GO Negotiation procedure may be omitted. Next, in step S307, the CPU 103 executes the communication parameter sharing processing of sharing the communication parameters between the apparatuses.

On the other hand, if it is determined in step S302 that the information processing apparatus 101 is currently connected to the access point, the CPU 103 issues, in step S305, a network setup request by DPP to the apparatus indicated by the information included in the QR code. In step S306, the CPU 103 performs network setup processing by DPP with the apparatus indicated by the information included in the QR code. Note that in this embodiment, the apparatus indicated by the information included in the QR code is assumed to be the communication apparatus 151. The processes in steps S305 and S306 will be described later with reference to FIG. 4.

In this embodiment, as explained above with reference to FIG. 2, the QR code read in step S301 includes information necessary for Wi-Fi Direct and information necessary for WEC. In step S302, in accordance with whether the information processing apparatus 101 is currently connected to the external access point, it is decided whether to perform Wi-Fi Direct connection or a network setup by DPP. Therefore, the user need not select one of Wi-Fi Direct and WEC as a setting method. Thus, the user need not recognize which of the setting methods is to be selected. Since the displayed QR code includes the information necessary for Wi-Fi Direct and the information necessary for WEC, the user need not set communication parameters corresponding to each setting method. Therefore, it is possible to reduce the complexity of a user operation of, for example, setting communication parameters or selecting a setting method by the user, and improve convenience.

In step S308, the CPU 103 performs connection to the apparatus indicated by the information included in the QR code using the communication parameters that have been shared between the apparatuses by executing the network setup processing by DPP in step S306 or the communication parameter sharing processing in step S307. After that, the processing shown in FIG. 3 ends.

In this embodiment, if it is determined in step S302 that the information processing apparatus 101 is currently connected to the external access point, the communication apparatus 151 and the information processing apparatus 101 are connected via the external access point in step S308. On the other hand, if it is determined in step S302 that the information processing apparatus 101 is not currently connected to the external access point, the communication apparatus 151 and the information processing apparatus 101 are directly connected in step S308 without intervention of the external access point.

Figure 4:
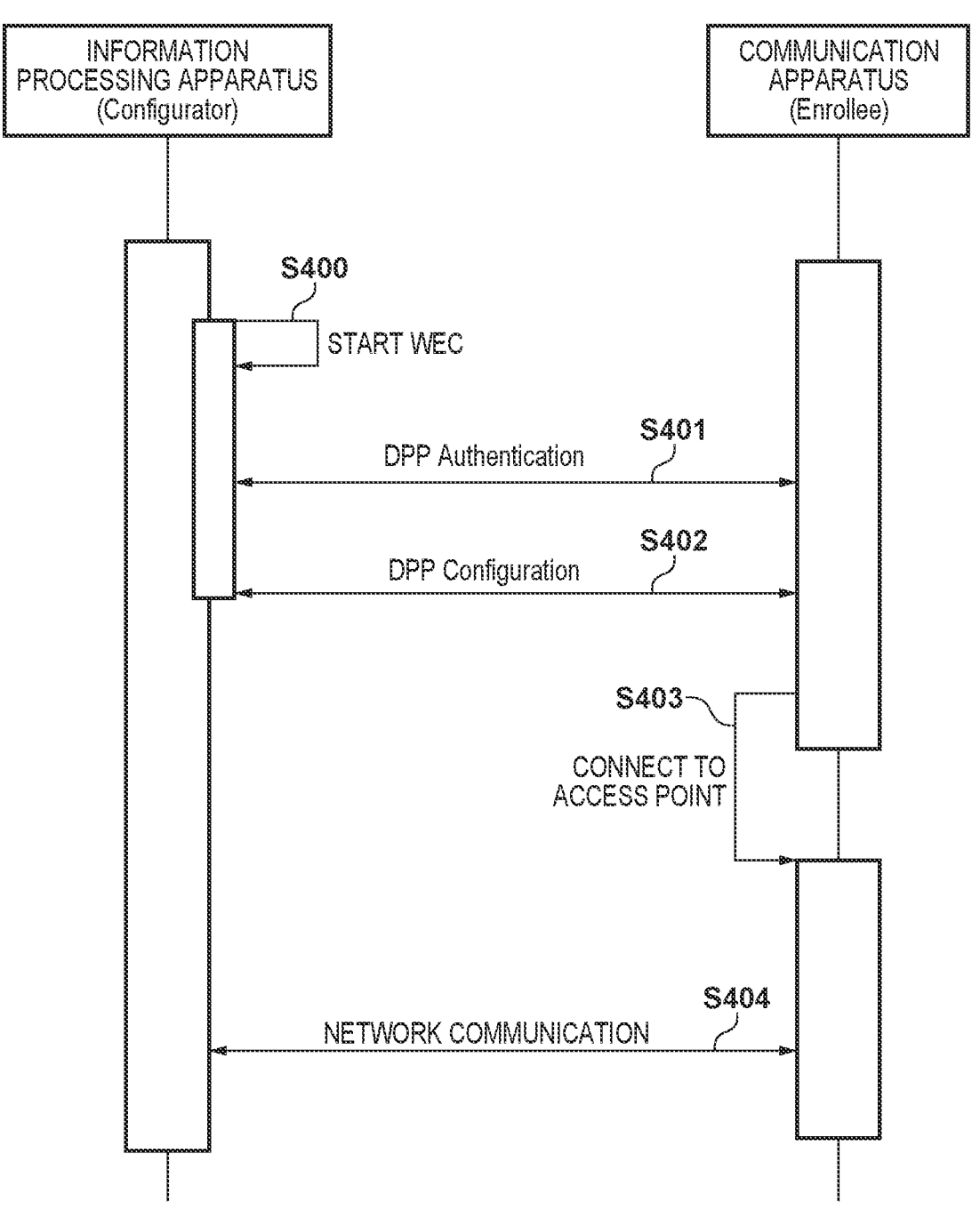
FIG. 4 is a sequence chart for explaining connection processing by WEC.

Processing in which the information processing apparatus 101 and the communication apparatus 151 execute connection by WEC in steps S206, S208, S305, S306, and S308 will be described next with reference to FIG. 4. The processing of the information processing apparatus 101 shown in FIG. 4 is implemented when, for example, the CPU 103 reads out the programs stored in the ROM 104 into the RAM 105 and executes them. Furthermore, the processing of the communication apparatus 151 shown in FIG. 4 is implemented when, for example, the CPU 154 reads out the programs stored in the ROM 152 into the RAM 153 and executes them.

Figure 9:
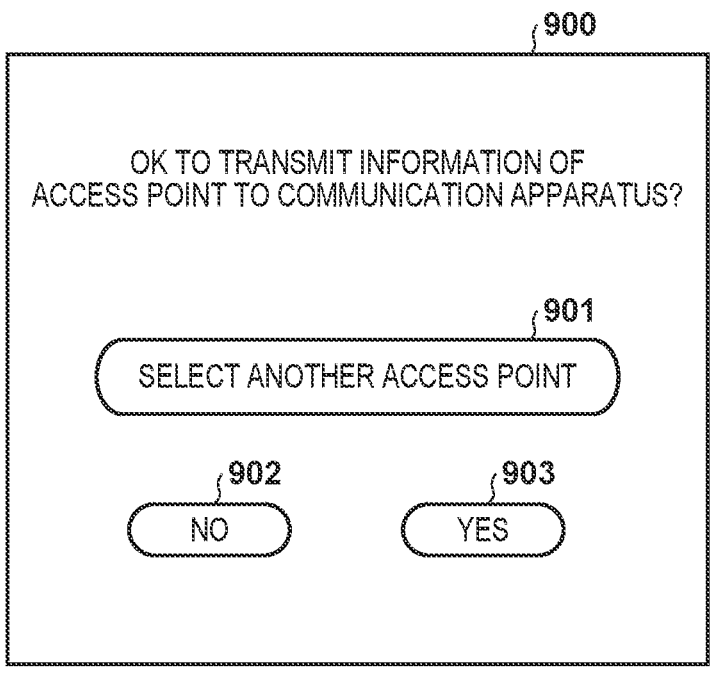
FIG. 9 is a view showing a WEC start screen.

In S400, the information processing apparatus 101 starts WEC using DPP by the function of the OS. More specifically, first, the information processing apparatus 101 instructs, from the setting application, the OS to activate a WEC application program (to be referred to as a WEC application hereinafter) of OS standard, thereby activating the WEC application. Thus, the WEC application operates in the foreground and the setting application operates in the background. Note that, for example, execution of the instruction corresponds to an instruction to execute WEC. Thus, the information processing apparatus 101 displays a WEC start screen by the WEC application. Note that the WEC application is a program installed in advance in the information processing apparatus 101, and is a program provided by the OS vendor of the information processing apparatus 101. If the WEC application is activated, the WEC associated information acquired by the setting application is provided to the WEC application. FIG. 9 shows an example of the WEC start screen displayed by the WEC application. Regions 901, 902, and 903 are displayed on a WEC start screen 900. The region 901 is a region configured to change an access point set as a setting target of WEC. Note that before the region 901 is operated, the access point set as the setting target of WEC is the access point currently connected to the information processing apparatus 101. If the region 901 is selected, the information processing apparatus 101 displays a list of access points, and sets an access point selected from the list by the user newly as the setting target of WEC. Note that the list of access points includes, for example, access points that the information processing apparatus 101 has found by an AP search and access points to which the information processing apparatus 101 has been connected once. The region 902 is a region used to cancel execution of WEC, and the region 903 is a region used to instruct execution of WEC. If the region 902 is operated, the information processing apparatus 101 ends the processing shown in the sequence chart. Note that in this case, it is considered that WEC has failed. Alternatively, if the region 903 is pressed, the information processing apparatus 101 advances to S401.

In S401, the WEC application executes API for WEC using WEC associated information and information about the access point set as the setting target of WEC, thereby instructing the OS to execute WEC. Then, processing called DPP Authentication is executed between the information processing apparatus 101 and the communication apparatus 151 by the function of the OS. In the DPP Authentication, authentication information and information used to encrypt information are communicated between the information processing apparatus 101 and the communication apparatus 151, thereby authenticating communication between the apparatuses. Note that various kinds of information transmitted from the information processing apparatus 101 in the communication of DPP Authentication are encrypted based on the WEC associated information that has been acquired by the information processing apparatus 101 by reading the QR code displayed by the communication apparatus 151. More specifically, in the DPP Authentication, first, the information processing apparatus 101 transmits an Authentication Request as a network setup request by DPP. Next, the communication apparatus 151 operating in the DPP mode is operating in the DPP mode that is a mode for waiting for the Authentication Request and thus receives the Request transmitted from the information processing apparatus 101. Upon receiving the Authentication Request, the communication apparatus 151 attempts to decrypt the received Request using a decryption key currently held by the communication apparatus. If the decryption succeeds, the communication apparatus 151 transmits an Authentication response to the information processing apparatus 101, thereby authenticating communication with the information processing apparatus 101. Note that if the information processing apparatus 101 cannot acquire correct WEC associated information, and the information cannot correctly be encrypted, decryption by the communication apparatus 151 fails. For this reason, authentication fails, and the Authentication response is not transmitted. When the information processing apparatus 101 receives the Authentication response, the DPP Authentication is completed. Furthermore, in the DPP Authentication, communication is executed using DPP.

Next, in S402, processing called DPP Configuration is executed between the information processing apparatus 101 and the communication apparatus 151 by the function of the OS. In the DPP Configuration, the information processing apparatus 101 transmits connection information used to connect the access point set as the setting target of WEC to the communication apparatus 151. Note that the connection information includes information representing the SSID, the password, and the encryption method of the access point set as the setting target of WEC. The password transmitted at this time is information input by the user on a screen displayed by an application supporting the OS when the connection between the information processing apparatus 101 and the external access point is established. The input password is information held by the OS when the connection between the information processing apparatus 101 and the external access point is established, and is information that the setting application does not hold. Since the password transmitted in S402 is information already held by the OS, the password need not newly be input by the user on the screen displayed by the setting application.

According to this embodiment, when the connection information is transmitted by WEC, as shown in FIG. 4, the password can be transmitted to the communication apparatus by secure communication without newly accepting input of the password from the user on the screen displayed by the setting application. Note that even in the DPP Configuration, communication is executed using DPP.

In S403, the communication apparatus 151 transitions to an infrastructure mode. Note that the communication apparatus 151 may end the DPP mode at this time. Then, using the connection information acquired by WEC, the communication apparatus 151 attempts connection to an access point corresponding to the connection information. If connection succeeds, the communication apparatus 151 can execute communication via a network formed by the connected access point from then on.

The communication via the network formed by the connected access point is executed by a protocol (more specifically, for example, a protocol unique to the vendor of the communication apparatus, such as Port 9100 or SNMP) different from DPP. Note that the communication apparatus 151 may transmit, to the information processing apparatus 101, information representing whether connection to the access point corresponding to the connection information acquired by WEC succeeds or not. Furthermore, if connection to the access point corresponding to the connection information acquired by WEC fails, information representing the cause of the failure may be transmitted to the information processing apparatus 101. The information transmission may be executed using DPP. Note that the connection to the access point corresponding to the connection information acquired by WEC fails because, for example, a communication error occurs in WEC or the access point cannot be found. The connection fails also because, for example, the information included in the QR code acquired from the communication apparatus 151 is not appropriate information. The connection fails also because, for example, the encryption method used for connection to the access point set as the setting target of WEC is an encryption method that the communication apparatus 151 does not support. The connection fails also because, for example, the encryption method used for connection to the access point set as the setting target of WEC is an encryption method that WEC does not support.

In S404, based on the end of execution of WEC, the information processing apparatus 101 switches the application operating in the foreground from the WEC application to the setting application. Then, the information processing apparatus 101 searches for the communication apparatus 151 on the network to which the information processing apparatus 101 itself belongs. This processing is implemented by the setting application that has received, from the OS, a notification representing the end of execution of WEC. If the communication apparatus 151 is found, the information processing apparatus 101 requests capability information from the communication apparatus 151, and the communication apparatus 151 transmits the capability information to the information processing apparatus 101. Hence, the information of the communication apparatus 151 is registered on the setting application, and communication with the communication apparatus 151 can be executed by the setting application from then on. More specifically, for example, a print job can be transmitted to the communication apparatus 151 by the setting application. Note that at this time, if the information processing apparatus 101 belongs to the network formed by the access point to which the communication apparatus 151 is connected by WEC, communication with the communication apparatus 151 can be executed via the access point. Furthermore, if communication between the information processing apparatus 101 and the communication apparatus 151 cannot be executed because, for example, the access point to which the communication apparatus 151 is connected is not the access point to which the information processing apparatus 101 is connected, the request or acquisition of capability information is omitted. Note that the communication in S404 is executed using, for example, a communication protocol different from DPP. After that, the information processing apparatus 101 ends the processing shown in FIG. 4. Note that a form in which the WEC start screen is displayed by the WEC application, and the WEC application executes API of WEC to instruct the OS to execute WEC has been described above. However, the present invention is not limited to this form. For example, the WEC start screen may be displayed by the setting application. In addition, the setting application may execute API of WEC to instruct the OS to execute WEC.

As described above, according to this embodiment, the communication apparatus 151 displays, as display information that can be captured, a QR code including communication parameters necessary for a plurality of connection methods, and the communication parameters necessary for each of the plurality of connection methods are shared by using, as a trigger, capturing of an image by the information processing apparatus 101. When one of the plurality of connection methods is used to connect the apparatuses, the connection method is decided in accordance with whether the information processing apparatus 101 is connected to the external access point. Then, when the communication apparatus 151 is notified of the connection method, the information processing apparatus 101 and the communication apparatus 151 are connected to each other. With this arrangement, the user need not select the connection method or the access point to be connected. This can prevent a situation in which the user selects an incorrect connection method or access point, the executed connection method is different between the apparatus displaying the QR code and the partner apparatus to be connected, and thus connection cannot correctly be performed.

According to this embodiment, for example, even if the user does not understand a difference between the connection methods, the connection method is decided in accordance with the connection status of the information processing apparatus 101 to the external access point, and it is thus possible to prevent a connection state unintended by the user. For example, assume a case where the information processing apparatus 101 is a smartphone, the communication apparatus 151 is a printer, and the user attempts to connect the printer to the smartphone in a state in which the smartphone is connected to a home router as an access point. At this time, if the user does not understand the difference between a network setup by WEC and establishment of Wi-Fi direct connection, and unintentionally selects processing of executing the latter, the smartphone is disconnected from the router, and is connected to the printer without intervention of the router. At this time, if the user does not understand that the smartphone is disconnected from the router, the smartphone cannot perform Internet communication via the router, and it may cost an Internet line fee by mobile communication, that is unintended by the user. However, according to this embodiment, if the smartphone is connected to the router, the user does not select the connection method, and thus need not understand the connection method. That is, by capturing, by the smartphone, the QR code displayed on the printer, the printer is connected to the router, and the smartphone remains connected to the router. Therefore, it is possible to prevent a situation in which the connection state unintended by the user is set and it costs an Internet line fee by mobile communication.

Second Embodiment

The second embodiment will be described below concerning points different from the first embodiment. In the first embodiment, which of a network setup by WEC and establishment of Wi-Fi direct connection is executed is decided in accordance with whether the information processing apparatus is currently connected to the external access point. In this embodiment, information included in a QR code to be displayed is made different in accordance with the apparatus state of a communication apparatus 151.

Figure 5:
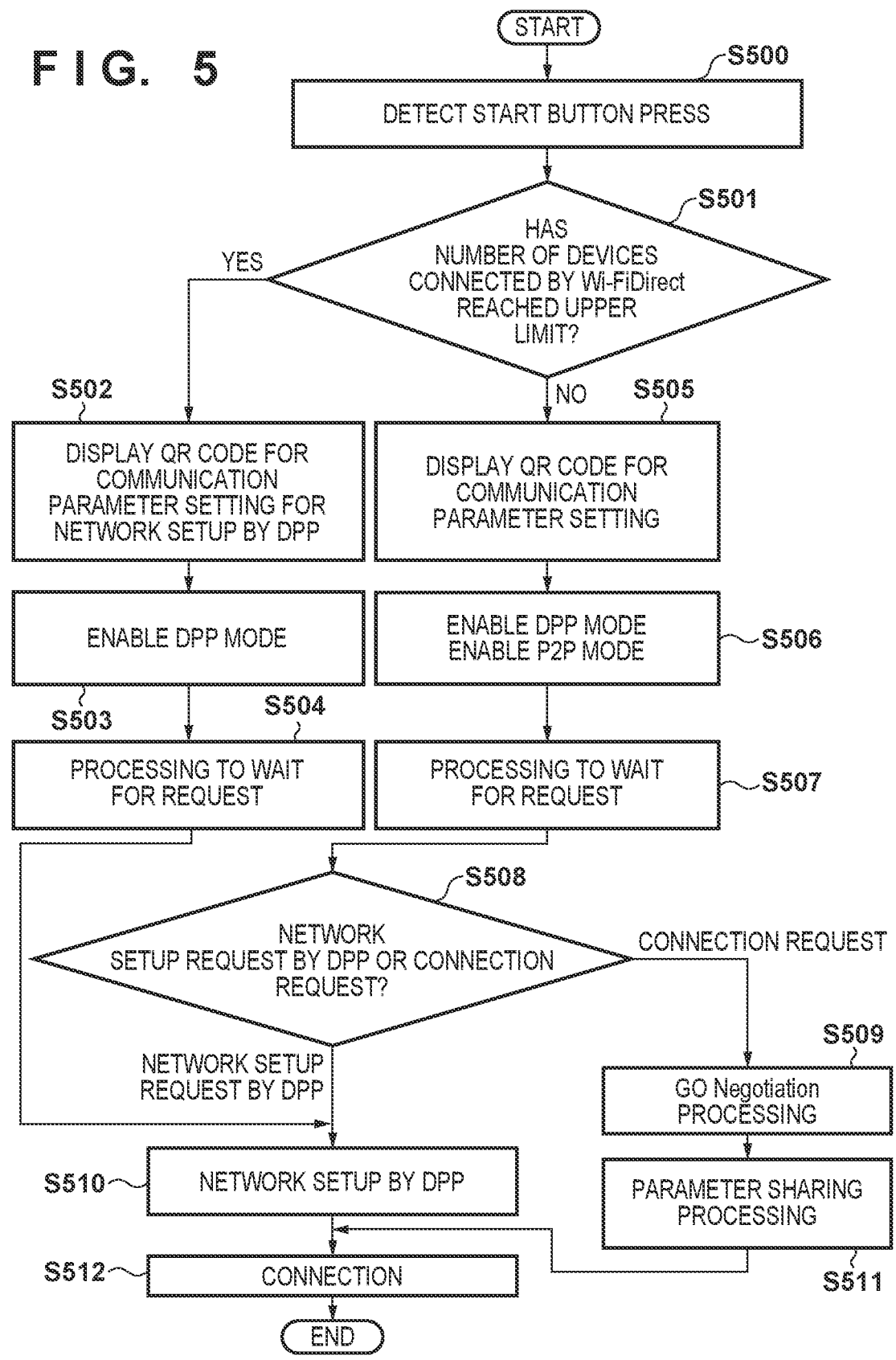
FIG. 5 is a flowchart illustrating connection processing executed by a communication apparatus.

FIG. 5 is a flowchart illustrating display control processing and connection processing of the communication apparatus 151 according to this embodiment. The processing shown in FIG. 5 is implemented when, for example, a CPU 154 reads out programs stored in a ROM 152 into a RAM 153 and executes them. In the processing shown in FIG. 5, when the number of information processing apparatuses 101 that can be connected to the communication apparatus 151 by Wi-Fi Direct is limited, information included in a QR code to be displayed is made different in accordance with the apparatus state of the communication apparatus 151.

In step S500, when the user presses a start button displayed on a display unit 158 of the communication apparatus 151, the CPU 154 of the communication apparatus 151 detects the pressing of the start button. In step S501, the CPU 154 determines whether the number of apparatuses connected by Wi-Fi Direct of the self-apparatus has reached an upper limit. If it is determined in step S501 that the number of connected apparatuses has reached the upper limit, the CPU 154 displays, in step S502, a QR code for a network setup by DPP on the display unit 158 not to perform Wi-Fi Direct connection. At this time, the displayed QR code includes information necessary for WEC, and does not include information necessary for Wi-Fi Direct. In step S503, the CPU 154 enables the DPP mode. In step S504, request wait processing is performed as in step S203, and the CPU 154 waits for a network setup request by DPP from the information processing apparatus 101. Note that the order of steps S503 and S504 is arbitrary, and steps S503 and S504 may be processed in a reverse order.

On the other hand, if it is determined in step S501 that the number of connected apparatuses has not reached the upper limit, it is possible to perform Wi-Fi Direct connection. Therefore, the same processes as in steps S201 to S208 of FIG. 2 are executed in steps S505 to S512.

As described above, according to this embodiment, a QR code corresponding to a state concerning Wi-Fi Direct connection of the communication apparatus 151 is displayed. With this arrangement, the user need not decide the connection method in consideration of the state of the communication apparatus 151, thereby making it possible to improve convenience.

Note that in step S501, the number of apparatuses connected by Wi-Fi Direct is used to perform the determination processing, and a QR code is decided. However, instead of the number of apparatuses connected by Wi-Fi Direct, other information may be used to perform determination processing as long as the information can be used to determine whether the communication apparatus 151 can perform Wi-Fi Direct connection.

Third Embodiment

The third embodiment will be described below concerning points different from the first and second embodiments. In this embodiment, information included in a QR code to be displayed is made different in accordance with the radio wave intensity of an access point, which has been detected by a communication apparatus 151.

FIG. 6 is a flowchart illustrating display control processing and connection processing of the communication apparatus 151 according to this embodiment. The processing shown in FIG. 6 is implemented when, for example, a CPU 154 reads out programs stored in a ROM 152 into a RAM 153 and executes them.

In step S600, when the user presses a start button displayed on a display unit 158 of the communication apparatus 151, the CPU 154 of the communication apparatus 151 detects the pressing of the start button. In step S601, the CPU 154 executes access point search processing. In step S602, the CPU 154 determines whether the radio wave intensity of an access point detected as a result of the search processing is equal to or higher than a predetermined value. Note that a practical example of the radio wave intensity is an SNR (Signal Noise Ratio).

If it is determined in step S602 that the radio wave intensity is lower than the predetermined value, the CPU 154 displays, in step S603, a QR code for Wi-Fi Direct on the display unit 158 not to perform a network setup by DPP. That is, in WEC, if the radio wave intensity between the communication apparatus 151 and the access point is low, the communication apparatus 151 may fail to perform connection to the access point after the start of WEC. Therefore, the QR code for Wi-Fi Direct is displayed on the display unit 158 in step S602 so as to perform Wi-Fi Direct connection. Note that the displayed QR code includes information necessary for Wi-Fi Direct and does not include information necessary for WEC. Then, in step S604, the CPU 154 enables the P2P mode. In step S605, request wait processing is performed as in step S203, and the CPU 154 waits for a connection request by Wi-Fi Direct from an information processing apparatus 101. Note that the order of steps S604 and S605 is arbitrary, and steps S604 and S605 may be processed in a reverse order.

Note that when a plurality of access points are detected in step S601, if it is determined, for at least one access point, in step S602, that the radio wave intensity is equal to or higher than the predetermined value, the process may advance to step S606. At this time, identification information of the access point satisfying the determination condition is included in the QR code. For example, if, as a result of capturing the QR code and analyzing it in the information processing apparatus 101, information of the access point currently connected to the information processing apparatus 101 is detected, the information processing apparatus 101 transmits a network setup request by DPP.

On the other hand, if it is determined in step S602 that the radio wave intensity is equal to or higher than the predetermined value, it is possible to perform a network setup by DPP. Therefore, the same processes as in steps S201 to S208 of FIG. 2 are executed in steps S606 to S613. After that, the processing shown in FIG. 6 ends.

As described above, according to this embodiment, a QR code corresponding to a state concerning connection of the communication apparatus 151 to the access point is displayed. With this arrangement, the user need not decide the connection method in consideration of the state of the communication apparatus 151, thereby making it possible to improve convenience.

Note that in step S602, it is determined whether the radio wave intensity is lower than the predetermined value and a QR code is decided. However, instead of the radio wave intensity, other information may be used to perform determination processing as long as the information can be used to determine whether the communication apparatus 151 can perform a network setup by DPP.

Fourth Embodiment

The fourth embodiment will be described below concerning points different from the first to third embodiments. In this embodiment, in a state in which it is impossible to perform Wi-Fi Direct connection and a state in which it is impossible to perform a network setup by DPP, a QR code including specific information is displayed.

FIGS. 7A and 7B are flowcharts illustrating display control processing and connection processing of a communication apparatus 151 according to this embodiment. The processing shown in FIGS. 7A and 7B is implemented when, for example, a CPU 154 reads out programs stored in a ROM 152 into a RAM 153 and executes them.

In step S700, when the user presses a start button displayed on a display unit 158 of the communication apparatus 151, the CPU 154 of the communication apparatus 151 detects the pressing of the start button. In step S701, the CPU 154 determines whether the number of apparatuses connected by Wi-Fi Direct of the self-apparatus has reached an upper limit. If it is determined in step S701 that the number of connected apparatuses has reached the upper limit, it is impossible to perform Wi-Fi Direct connection, and thus the CPU 154 performs access point search processing in step S702.

In step S703, the CPU 154 determines whether the radio wave intensity of an access point detected as a result of the search processing is equal to or higher than a predetermined value. If it is determined in step S703 that the radio wave intensity of the found access point is lower than the predetermined value, the CPU 154 displays, in step S704, a QR code including URL information. The URL information is, for example, information indicating a URL at which the manual of the communication apparatus 151 or an information processing apparatus 101 and the like can be referred to.

The information processing apparatus 101 reads the QR code displayed by the communication apparatus 151, analyzes the URL information included in the QR code, and displays the manual in a browser or the like on a display unit 108 of the information processing apparatus 101. For example, in the manual, a notification concerning the current state of the communication apparatus 151 may be made and a procedure of setting a state in which it is possible to perform a network setup by DPP or Wi-Fi Direct may also be displayed. This can notify the user that it is impossible to perform connection, and also present, to the user, information for setting an apparatus state in which it is possible to perform a network setup by DPP or Wi-Fi Direct.

In step S704, the QR code is exemplified. However, the information displayed by the communication apparatus 151 need not be the QR code and may be message information such as a warning, a two-dimensional code, or the like. As an example of displaying the QR code including the URL information of the manual or the like, an example of using, as a determination target, the number of apparatuses connected by Wi-Fi Direct or the radio wave intensity of the found access point has been explained. However, another apparatus status may be a determination target to display the QR code including the URL information of the manual or the like. For example, if the user who manages the communication apparatus 151 determines a state in which the communication apparatus 151 is intentionally locked not to perform a network setup by DPP or Wi-Direct, the QR code including the URL information of the manual or the like may be displayed. In a state in which the communication apparatus 151 is in preparation, for example, in a case where it is determined that hardware initialization has not been performed, the QR code including the URL information of the manual or the like may be displayed.

If it is determined in step S701 that the number of apparatuses connected by Wi-Fi Direct has not reached the upper limit, the same processes as in steps S201 to S208 of FIG. 2 are executed in steps S708 to S715. If it is determined in step S703 that the radio wave intensity of the access point is equal to or higher than the predetermined value, the same processes as in steps S502 to S504 of FIG. 5 are executed in steps S705 to S707. Then, after the processing in step S707, step S713 is executed.

The QR code displayed by the communication apparatus 151 may include the URL information of the manual or the like not only in step S704 but also in step S705 or S708. With this arrangement, when connection by each method fails by the processing of the information processing apparatus 101, the manual or the like can be displayed on the display unit 158 of the information processing apparatus 101.

As described above, according to this embodiment, in a case where the communication apparatus 151 cannot execute connection by any connection method, a QR code for accessing information for eliminating the state can be displayed.

Furthermore, in FIGS. 7A and 7B, the determination processing of step S701 is performed before the determination processing of step S703 but the present invention is not limited to this. Another example of FIGS. 7A and 7B will be described below. For example, after the processing shown in FIGS. 7A and 7B is started, access point search processing is performed first and it is determined whether the radio wave intensity of the access point is equal to or higher than the predetermined value. If it is determined that the radio wave intensity of the access point is equal to or higher than the predetermined value, it is determined whether the number of apparatuses connected by Wi-Fi Direct has reached the upper limit. If it is determined that the number of apparatuses has reached the upper limit, the processes of steps S502 to S504, S510, and S512 for a network setup by DPP are performed. On the other hand, if it is determined that the number of apparatuses has not reached the upper limit, the processes of steps S201 to S208 are performed.

On the other hand, if it is determined that the radio wave intensity of the access point is lower than the predetermined value, it is determined whether the number of apparatuses connected by Wi-Fi Direct has reached the upper limit. If it is determined that the number of apparatuses has not reached the upper limit, the processes of steps S205, S207, and S208 for Wi-Fi Direct connection are performed. On the other hand, if it is determined that the number of apparatuses has reached the upper limit, the QR code including the URL information of the manual or the like is displayed, as in step S704.

Fifth Embodiment

The fifth embodiment will be described below concerning points different from the first to fourth embodiments. In the arrangement of the communication apparatus 151 according to the first embodiment, the QR code read by the information processing apparatus 101 includes information necessary for Wi-Fi Direct and information necessary for WEC. In the arrangement of the communication apparatus 151 according to each of the second to fourth embodiments, there are a case where the QR code includes only one of the above-described pieces of information, a case where the QR code includes both the pieces of information, and a case where the QR code includes error information. In this embodiment, when a communication apparatus 151 has the arrangement according to each of the second to fourth embodiments, an information processing apparatus 101 appropriately performs wireless connection to the communication apparatus 151 by Wi-Fi Direct or WEC in accordance with which of the above cases corresponds to a QR code.

In this embodiment, it is configured that the information processing apparatus 101 can identify which of the cases corresponds to a read QR code. For example, in accordance with the type of a QR code to be displayed, the communication apparatus 151 may add identification information representing the type of the QR code to a predetermined region of the QR code in addition to information of each connection method. Furthermore, the communication apparatus 151 may add, to a predetermined region of the QR code, identification information corresponding to each of error information and information of each connection method. The information processing apparatus 101 can identify which of the cases corresponds to the QR code by referring to the predetermined region of the read QR code.

Figure 8A:
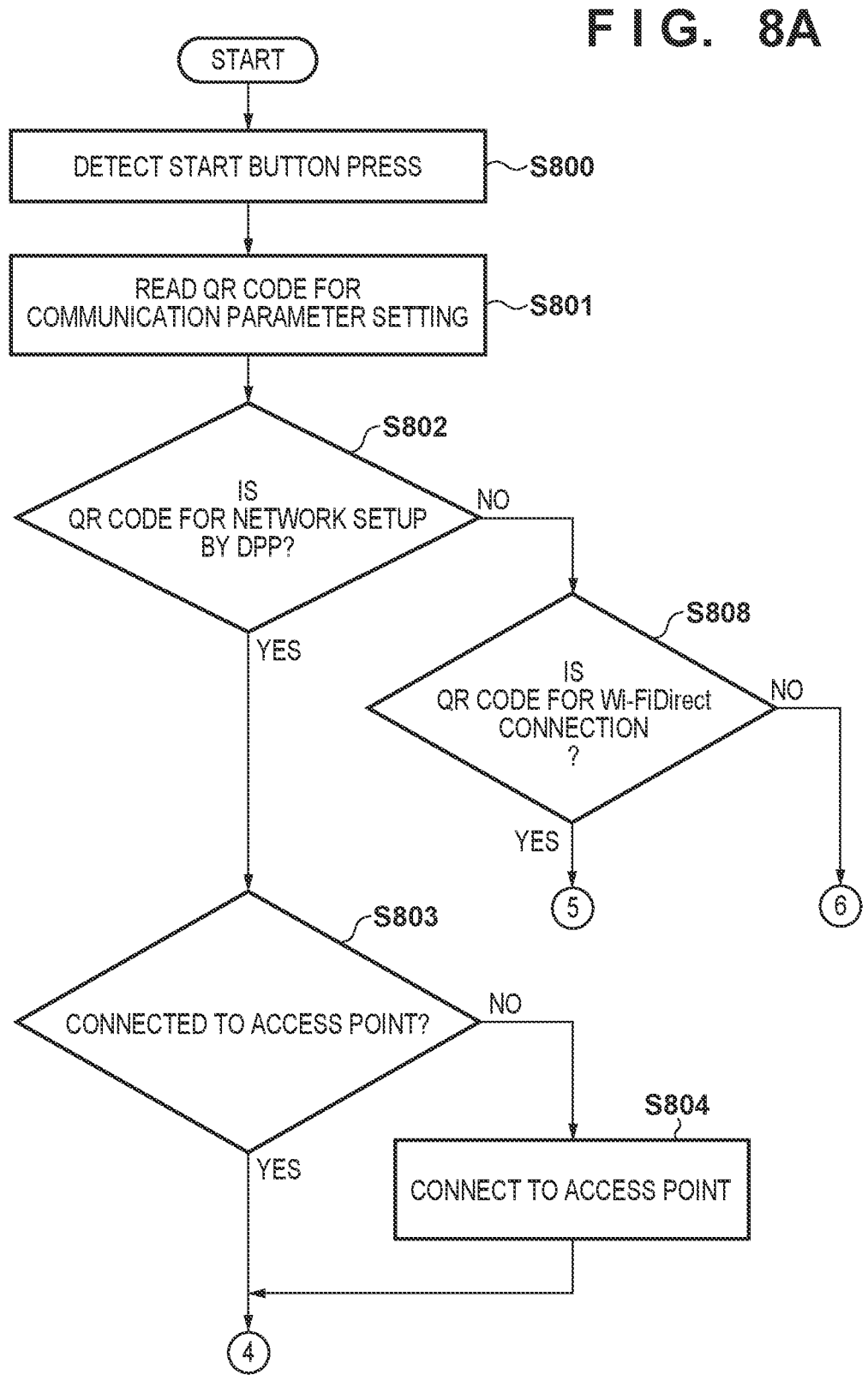
FIG. 8A is a flowchart illustrating connection processing executed by an information processing apparatus.

FIGS. 8A and 8B are flowcharts illustrating processing of the information processing apparatus 101 according to this embodiment. The processing shown in FIGS. 8A and 8B is implemented when, for example, a CPU 103 reads out programs stored in a ROM 104 into a RAM 105 and executes them.

In step S800, when the user presses a start button displayed on a display unit 108 of the information processing apparatus 101, the CPU 103 of the information processing apparatus 101 detects the pressing of the start button, and causes, in step S801, an image capturing unit 112 to read a QR code for communication parameter setting, displayed by the communication apparatus 151. The QR code may be read by using, as a trigger, a timing other than the timing of pressing the start button. For example, the QR code may automatically be read by using, as a trigger, another user operation or detection of the QR code within the angle of view of the image capturing unit 112. If the captured QR code includes no information necessary to set communication parameters, the CPU 103 may make a notification of error information, and end the processing shown in FIGS. 8A and 8B.

In step S802, the CPU 103 determines whether the read QR code is a QR code for a network setup by DPP. If it is determined in step S802 that the QR code is a QR code for a network setup by DPP, the process advances to step S803. A case where it is determined that the QR code is a QR code for a network setup by DPP indicates a state in which the communication apparatus 151 cannot execute Wi-Fi Direct connection due to some reasons such as the limit of the number of connected apparatuses. Therefore, the information processing apparatus 101 executes processing for a network setup by DPP.

In step S803, the CPU 103 determines whether the self-apparatus is currently connected to an external access point. If it is determined in step S803 that the self-apparatus is not currently connected to an external access point, the CPU 103 performs, in step S804, connection to an external access point. For example, an access point to which the self-apparatus has been connected by performing an access point search in the past, that is, an access point corresponding to access point information (SSID, password, and the like) held in the information processing apparatus 101 may be decided as a connection destination access point. With this arrangement, the user need not select an access point and input a password, thereby making it possible to improve convenience. The connection destination access point may be decided by another method. For example, the communication apparatus 151 may include, in a QR code displayed on the display unit of the communication apparatus 151, information (SSID, password, and the like) of an access point whose radio wave intensity is determined, in step S703 of FIG. 7B, to be equal to or higher than a predetermined value. The access point corresponding to the information included in the QR code may be decided also based on another condition. For example, the access point may be decided based on the condition that the access point is an access point to which the communication apparatus 151 has been connected in the past. Then, the CPU 103 of the information processing apparatus 101 analyzes, in step S804, the access point information from the read QR code. At this time, based on the analysis result, the CPU 103 may decide, as the connection destination access point, an access point that satisfies the condition. For example, the CPU 103 may decide, as the connection destination access point, the access point corresponding to the access point information (SSID, password, and the like) held in the information processing apparatus 101. The arrangement in which the user need not make selection and input a password has been explained above. However, the user may be made to select the connection destination access point. For example, the CPU 103 may search for external access points, display found access points on the display unit 108 of the information processing apparatus 101, and make the user select an access point. The user may decide, as the connection destination access point, an access point that has the highest radio wave intensity when performing the access point search. At this time, the condition that access point information is held in the information processing apparatus 101 may be used.

If it is determined in step S803 that the self-apparatus is currently connected to the external access point, processing for a network setup by DPP is performed. That is, the same processes as in steps S305, S306, and S308 of FIG. 3 are executed in steps S805 to S807. After that, the processing shown in FIGS. 8A and 8B ends.

If it is determined in step S802 that the QR code is not a QR code for a network setup by DPP, the CPU 103 determines in step S808 whether the QR code is a QR code for Wi-Fi Direct connection. If it is determined that the QR code is a QR code for Wi-Fi Direct connection, the process advances to step S809. The case where it is determined that the QR code is a QR code for Wi-Fi Direct connection indicates a state in which the communication apparatus 151 cannot execute a network setup by DPP due to some reasons such as the radio wave condition.

In step S809, the CPU 103 determines whether the information processing apparatus 101 can execute connection processing by Wi-Fi Direct. For example, if the information processing apparatus 101 is not currently connected to the external access point, it may be determined that the information processing apparatus 101 can execute connection processing by Wi-Fi Direct. If the information processing apparatus 101 is currently connected to the external access point, the CPU 103 may display, on the display unit 108 of the information processing apparatus 101, a message for prompting to perform Wi-Fi Direct connection. This arrangement can prevent a connection state unintended by the user.

If it is determined in step S809 that the information processing apparatus 101 can execute connection processing by Wi-Fi Direct, processing for Wi-Fi Direct connection is performed. That is, the same processes as in steps S304, S307, and S308 of FIG. 3 are executed in steps S810 to S813. After that, the processing shown in FIGS. 8A and 8B ends.

On the other hand, if it is determined in step S809 that the information processing apparatus 101 cannot execute connection processing by Wi-Fi Direct, the CPU 103 displays, in step S815, on the display unit 108, a message of notifying that Wi-Fi Direct connection and a network setup by DPP cannot be performed. At this time, for example, if the information processing apparatus 101 is currently connected to the external access point, a message for prompting to perform Wi-Fi Direct connection and its procedure may be displayed on the display unit 108 of the information processing apparatus 101. As a method of displaying the procedure, a manual may be displayed in a browser or the like. This arrangement prevents a connection state unintended by the user, and can execute connection in accordance with the state of the communication apparatus 151. After step S815, the processing shown in FIGS. 8A and 8B ends.

If it is determined in step S808 that the QR code is not a QR code for Wi-Fi Direct connection, the CPU 103 determines in step S814 whether the QR code is a QR code for error display. If it is determined that the QR code is a QR code for error display, the CPU 103 analyzes, in step S815, a URL included in the QR code and displays a manual in a browser or the like on the display unit 108 of the information processing apparatus 101. The manual is a manual indicating an operation procedure for setting an apparatus state of the communication apparatus 151 necessary to perform a network setup by DPP or W-Fi Direct.

On the other hand, the case where it is determined in step S814 that the QR code is not a QR code for error display indicates a case where the QR code includes information necessary for Wi-Fi Direct and information necessary for WEC. In other words, the communication apparatus 151 is in the apparatus state in which it can execute a network setup by DPP and Wi-Fi Direct. Therefore, the same processes as those in step S302 and the subsequent steps of FIG. 3 of the first embodiment are performed in step S816.

Note that in FIGS. 8A and 8B, after it is determined whether the QR code is a QR code for a network setup by DPP, it is determined whether the QR code is a QR code for Wi-Fi Direct connection. However, the present invention is not limited to this. For example, it may be determined first whether the QR code is a QR code for Wi-Fi Direct connection. In this case, if it is determined that the QR code is not a QR code for Wi-Fi Direct connection, it is determined whether the QR code is a QR code for a network setup by DPP. Then, if it is determined that the QR code is not a QR code for a network setup by DPP, processes in step S814 and subsequent steps are performed.

As described above, according to this embodiment, the communication apparatus 151 displays a QR code including communication parameters necessary for a plurality of connection methods, and the communication parameters are shared when the information processing apparatus 101 captures the image as a trigger. Then, the apparatuses are connected to each other using one of the plurality of connection methods. At this time, even if the communication apparatus 151 is in the apparatus state in which it cannot perform connection by one of the plurality of connection methods, the apparatuses are connected to each other by the connection method according to the apparatus state of the communication apparatus 151 by using, as a trigger, capturing of the image by the information processing apparatus 101.

Therefore, even if the communication apparatus 151 cannot perform connection by one of the plurality of connection methods, the user need not select the connection method and an access point to be connected. That is, it is possible to prevent a situation in which the user selects an incorrect connection method or access point, the connection method executed with the connection partner apparatus is different, and thus connection cannot correctly be performed. Even if the user does not understand the difference in connection method, the connection method is decided in accordance with the state of the communication apparatus 151 or the information processing apparatus 101, and it is thus possible to prevent a connection state unintended by the user.

Furthermore, even if the communication apparatus 151 cannot perform connection by all the plurality of connection methods, the fact that the communication apparatus 151 is in the state is displayed by the information processing apparatus 101. If it is impossible to perform connection due to the apparatus state of the information processing apparatus 101, the fact that the information processing apparatus 101 is in the state is displayed by the information processing apparatus 101. In the display, a manual is displayed in a browser or the like. Thus, for example, a method of recovering to the apparatus state necessary for connection is displayed in accordance with the apparatus state of the communication apparatus 151 and the apparatus state of the information processing apparatus 101. Therefore, it is possible to prevent a situation in which since the user cannot understand the method of recovering the apparatus, it is impossible to recover the apparatus and correctly perform connection.

Each of the above-described embodiments has explained the arrangement in which information for performing communication parameter setting using an image of a QR code is shared between apparatuses. However, instead of capturing the QR code, wireless communication such as NFC or Bluetooth® may be used. Alternatively, wireless communication such as IEEE 802.11ad or TansferJet® may be used. Instead of the QR code, a barcode or a two-dimensional code may be used. Instead of machine-readable information such as a QR code, user-readable information such as text information may be used. Each of the embodiments has explained the case where communication between apparatuses is performed by wireless LAN communication complying with IEEE 802.11 but the present invention is not limited to this. For example, a wireless communication medium such as wireless USB, MBOA, Bluetooth®, UWB (Ultra Wide Band), ZigBee, or NFC may be used to perform communication. MBOA is an abbreviation for Multi Band OFDM Alliance. Note that UWB includes wireless USB, wireless 1394, and WiNET.

In each of the above-described embodiments, connection information of a connected AP is transmitted by WEC. However, the present invention is not limited to this. Connection information of an AP different from the connected AP may be transmitted, and determination may be performed with respect to an AP different from the connected AP. More specifically, an AP different from the connected AP may be, for example, an access point that was not connected to the information processing apparatus 101 when a setting operation was performed but that had been connected to the information processing apparatus 101 at any timing before the setting operation was performed. Alternatively, the AP may be an access point selected by the user from a list of access points to which the information processing apparatus 101 has been connected once. This is because if connection information is connection information of an access point to which the information processing apparatus 101 has been connected at any timing and is stored in the OS, it can be transmitted by WEC.

In each of the above-described embodiments, a network setup is executed by DPP. However, the present invention is not limited to this. For example, HTTP (Hyper Text Transfer Protocol) may be used instead of DPP. The communication apparatus 151 may operate in a mode for executing a network setup by a protocol different from DPP, instead of the DPP mode. That is, a network setup may be executed by any function different from WEC as long as the function executes a network setup based on information acquired by reading a QR code.

According to the present invention, it is possible to improve user convenience when establishing wireless connection between apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus communicable with an information processing apparatus, comprising:

at least one memory storing instructions; and at least one processor that executes the stored instructions to cause the communication apparatus to:

display, on a display, to be captured by the information processing apparatus, display information including first information used for communication for establishing, by a first connection method, wireless connection between the communication apparatus and an external access point different from the information processing apparatus and the communication apparatus, and second information for establishing, by a second connection method without intervention of the external access point, wireless connection between the information processing apparatus and the communication apparatus;

receive a request transmitted from the information processing apparatus based on one of the first information and the second information;

execute the communication for establishing the wireless connection by the first connection method based on the request transmitted based on the first information;

establish the wireless connection by the first connection method based on the communication for establishing the wireless connection by the first connection method; and establish the wireless connection by the second connection method based on the request transmitted based on the second information.

2. The communication apparatus according to claim 1, wherein in a case where the communication apparatus is in a first state, display, on the display, the display information including both the first information and the second information, and in a case where the communication apparatus is in a second state, display, on the display, the display information including one of the first information and the second information.

3. The communication apparatus according to claim 2, wherein the first state is a state in which both the communication for establishing the wireless connection by the first connection method and the wireless connection by the second connection method are possible.

4. The communication apparatus according to claim 2, wherein the second state is a state in which one of the communication for establishing the wireless connection by the first connection method and the wireless connection by the second connection method is impossible.

5. The communication apparatus according to claim 2, wherein execution of the stored instruction further causes the communication apparatus to determine whether the communication apparatus is in the first state or the second state, wherein control is performed to display, on the display, the display information corresponding to a result of the determination.

6. The communication apparatus according to claim 5, wherein based on at least one of radio wave intensity and the number of apparatuses already connected by the second connection method, determines whether the communication apparatus is in the first state or the second state.

7. The communication apparatus according to claim 6, wherein execution of the stored instruction further causes the communication apparatus to search for an external access point, wherein in a case where radio wave intensity detected from an access point found by the search is lower than a predetermined value, determines that the communication apparatus is in the second state, and display, on the display, the display information including the second information and including no first information.

8. The communication apparatus according to claim 6, wherein in a case where the number of apparatuses already connected by the second connection method has reached an upper limit, determines that the communication apparatus is in the second state, and display, on the display, the display information including the first information and including no second information.

9. The communication apparatus according to claim 1, wherein in a case where the communication apparatus can perform neither the wireless connection by the first connection method nor the wireless connection by the second connection method, display, on the display, the display information including error information.

10. The communication apparatus according to claim 1, wherein the first information and the second information include identification information of the communication apparatus.

11. The communication apparatus according to claim 1, wherein in establishing the wireless connection by each of the first connection method and the second connection method, communication parameters are communicated between the communication apparatus and the information processing apparatus, and the first information and the second information are used to encrypt the communication parameters.

12. The communication apparatus according to claim 11, wherein the information used to encrypt the communication parameters includes at least one of a public key and a shared key.

13. The communication apparatus according to claim 11, wherein the communication parameters include at least one of a network identifier and information for authentication.

14. The communication apparatus according to claim 11, wherein the communication for establishing the wireless connection by the first connection method is communication executed by DPP (Device Provisioning Protocol).

15. The communication apparatus according to claim 14, wherein the communication executed by DPP (Device Provisioning Protocol) is communication of the communication parameters.

16. The communication apparatus according to claim 11, wherein the second connection method is a connection method by WFD (Wi-Fi Direct).

17. The communication apparatus according to claim 1, wherein the display information is displayed as encoded code information.

18. The communication apparatus according to claim 1, wherein the communication apparatus is a printer.

19. A method executed in a communication apparatus communicable with an information processing apparatus, comprising:

displaying, on a display, to be captured by the information processing apparatus, display information including first information used for communication for establishing, by a first connection method, wireless connection between the communication apparatus and an external access point different from the information processing apparatus and the communication apparatus, and second information for establishing, by a second connection method without intervention of the external access point, wireless connection between the information processing apparatus and the communication apparatus;

receiving a request transmitted from the information processing apparatus based on one of the first information and the second information;

executing the communication for establishing the wireless connection by the first connection method based on the request transmitted based on the first information;

establishing the wireless connection by the first connection method based on the communication for establishing the wireless connection by the first connection method; and establishing the wireless connection by the second connection method based on the request transmitted based on the second information.

20. A non-transitory computer-readable storage medium storing one or more programs configured to cause one or more computers of an information processing apparatus communicable with a communication apparatus:

acquire display information displayed on a display of the communication apparatus by capturing the display;

decide, based on at least one of the acquired display information and a connection status between the information processing apparatus and an external access point, whether to issue, to the communication apparatus, a request of communication for establishing, by a first connection method, wireless connection between the communication apparatus and the external access point or to issue, to the information processing apparatus, a request to establish, by a second connection method, wireless connection between the communication apparatus and the information processing apparatus; and request, based on the decision, the communication apparatus to perform the communication for establishing the wireless connection by the first connection method or to perform the wireless connection by the second connection method.

21. The storage medium according to claim 20, wherein in a case where there is the external access point that is currently connected to the information processing apparatus, decides to issue, to the communication apparatus, the request of the communication for establishing, by the first connection method, the wireless connection between the communication apparatus and the external access point, and in a case where there is no external access point that is currently connected to the information processing apparatus, decides to issue, to the information processing apparatus, the request to establish, by the second connection method, the wireless connection between the communication apparatus and the information processing apparatus.

22. The storage medium according to claim 20, wherein in a case where the display information includes information indicating that the communication apparatus can execute one of the wireless connection by the first connection method and the wireless connection by the second connection method, the decision is performed based on the display information.

23. The storage medium according to claim 22, the one or more programs is further configured to cause the one or more computers to display, on a display of the information processing apparatus, information indicating an error based on the display information in a case where the display information includes information indicating that the communication apparatus can execute neither the wireless connection by the first connection method nor the wireless connection by the second connection method.

24. A system comprising a communication apparatus and an information processing apparatus, the communication apparatus includes at least one memory storing instructions and at least one processor that executes the instructions and cause the communication apparatus to:

display, on a display, to be captured by the information processing apparatus, display information including first information used for communication for establishing, by a first connection method, wireless connection between the communication apparatus and an external access point different from the information processing apparatus and the communication apparatus, and second information for establishing, by a second connection method without intervention of the external access point, wireless connection between the information processing apparatus and the communication apparatus, receive a request transmitted from the information processing apparatus based on one of the first information and the second information, execute the communication for establishing the wireless connection by the first connection method based on the request transmitted based on the first information, establish the wireless connection by the first connection method based on the communication for establishing the wireless connection by the first connection method, and establish the wireless connection by the second connection method based on the request transmitted based on the second information, and the information processing apparatus includes at least one memory storing instructions and at least one processor that executes the instructions to cause the information processing apparatus to:

acquire the display information displayed on the display of the communication apparatus by capturing the display, decide, based on at least one of the acquired display information and a connection status between the information processing apparatus and the external access point, whether to issue, to the communication apparatus, the request of the communication for establishing, by the first connection method, the wireless connection between the communication apparatus and the external access point or to issue, to the information processing apparatus, the request to establish, by the second connection method, the wireless connection between the communication apparatus and the information processing apparatus, and request, based on the decision, the communication apparatus to perform the communication for establishing the wireless connection by the first connection method or to perform the wireless connection by the second connection method.

* * * * *